US007240093B1

(12) United States Patent
Danieli et al.

(10) Patent No.: US 7,240,093 B1
(45) Date of Patent: Jul. 3, 2007

(54) USE OF ONLINE MESSAGING TO FACILITATE SELECTION OF PARTICIPANTS IN GAME PLAY

(75) Inventors: Damon V. Danieli, Clyde Hill, WA (US); John R. Selbie, Redmond, WA (US); Matthew J. Stipes, Woodinville, WA (US); John P. Pennock, Issaquah, WA (US); Drew C. Bamford, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/515,793

(22) Filed: Feb. 29, 2000

(51) Int. Cl.
*G06F 15/16* (2006.01)
*A63F 13/00* (2006.01)
*A63F 9/24* (2006.01)

(52) U.S. Cl. ............... 709/205; 709/203; 709/213; 463/42; 463/40; 463/35; 463/36; 715/733; 715/751; 715/757; 715/758

(58) Field of Classification Search ............ 463/40, 463/42, 48
See application file for complete search history.

(56) References Cited

U.S. PATENT DOCUMENTS

| 6,106,399 | A  | * | 8/2000  | Baker et al. ............ 463/42 |
| 6,134,590 | A  | * | 10/2000 | Perlman ............... 709/228 |
| 6,179,713 | B1 | * | 1/2001  | James et al. ........... 463/42 |
| 6,241,612 | B1 | * | 6/2001  | Heredia ............... 463/42 |
| 6,475,089 | B1 | * | 11/2002 | Lee .................. 463/40 |
| 6,554,707 | B1 | * | 4/2003  | Sinclair et al. ......... 463/39 |
| 6,579,184 | B1 | * | 6/2003  | Tanskanen ............. 463/41 |

OTHER PUBLICATIONS

"TeamSpeak CommunicationSystem": <URL:http://www.goteamspeak.com/index.php?page=about>.*

* cited by examiner

Primary Examiner—Syed A. Zia
(74) Attorney, Agent, or Firm—Workman Nydegger

(57) ABSTRACT

A method and system facilitating selection of participants in multiplayer online electronic games. The method provides an efficient procedure for players to host and join new instances of multiplayer online electronic games, as well as providing a scheme that enables players to join multiplayer online electronic games that are already in progress. The method is implemented through a gaming utility that runs on each player's electronic device (e.g. PC) and interacts behind the scenes with an online messaging service. Player hosts are enabled to select players from a list of contacts provided by the online messaging service who they want to invite to join a chat session. A selected multiplayer online electronic game is selectively launched on all of the player's computers through a single command issued by the host. Additionally, the gaming utility provides players with a list of existing chat sessions being hosted by other players so as to enable the players to join multiplayer online electronic games that are already in progress. The system includes a plurality of electronic devices linked in communication across a communications network, such as a LAN or the Internet. Each electronic device is operatively coupled to a headset having a pair of headphones and a microphone. The headset is worn by a player, enabling the players to verbally communicate with others in a verbal chat session.

29 Claims, 16 Drawing Sheets

USE OF ONLINE MESSAGING TO FACILITATE SELECTION OF PARTICIPANTS IN GAME PLAY

FIELD OF THE INVENTION

This invention generally relates to a method and system for enabling users to host and/or join online electronic games, and more specifically, pertains to using online messaging to facilitate enable users to select participants for game play.

BACKGROUND OF THE INVENTION

The popularity of multiplayer online games on the Internet has exploded in recent years. Unlike conventional single-player electronic games, multiplayer online games enable a player to participate in games with other players, either as an individual or as a team member. The multiplayer aspect of these games adds to the players' gaming experience by offering new gaming considerations, including strategy, teamwork, and rivalries.

In order to enable playing of a multiplayer online game, host services must be provided by either an individual or a third-party host. Host services are typically performed on a host computer or server running a copy of the game, and generally concern controlling overall aspects of the game, such as keeping track of the score and updating the game environment. In addition, the host determines who the game participants are, and whether new players may be added.

Examples of multiplayer online games that are hosted by third-party providers can be found at many gaming web sites, including Microsoft Corporation's Internet Game Zone, which provides a myriad of single player and multiplayer online games that are played by over a half-million users daily. In order to play most of the games on a gaming site, it is necessary for users to download (or procure separately) a copy of the game the user wishes to play. Typically, some of these games may be downloaded for free, while others must be purchased, either online, or at a retail outlet. In addition, many gaming sites offer "premium" games that can only be accessed if the user has paid a membership fee to play such games, or has agreed to pay a usage fee (e.g., an hourly fee, daily fee, etc.).

In addition to Internet gaming site hosts, individuals may also provide hosting services by using their own computer for such purposes. Such a player is referred to as a "host player." A significant advantage of this configuration is that it generally provides increased performance over games hosted by third-party sites, since the host services for these sites are usually provided by a limited number of servers, each of which is used to simultaneously host a large number of games. In addition, by using one of the game players as the host for the game, the players do not have to pay an access charge to play the game.

In order to facilitate online game playing, it is necessary to enable players to join games already in progress, or enable players to initiate a new game in a manner that allows other players to join in. Oftentimes, players prefer to play games against (or with) players they already know. In general, many of the third-party gaming sites provide host services that make it relatively easy to join games, schedule future games, establish teams, etc. However, there is presently no way to easily initiate game play between players for games that are hosted by individual players.

In order to host a game, the host needs to be able to identify and communicate with all of the game participants. A common scheme for performing this task involves the use of Internet Protocol (IP) addressing. In order to communicate over a communications network, such as the Internet, each device (e.g., a player's computer) connected to the network must be assigned to a unique network address. Under the Internet's present TCP/IP (Transmission Control Protocol/Internet Protocol) scheme (which is also used for other networks), each device connected to the Internet is identified by a 32-bit IP address comprising four 8-bit segments separated by dots, e.g., 207.21.32.212. Each IP address comprises a unique network ID, and a unique host ID, the latter of which identifies a workstation, server, router, or other TCP/IP device on the network. Accordingly, each of the individual computers used by the game players is assigned to its own IP address. As a result, a game host can enable new players to join a game by telling the other players the IP address of the host's machine.

Initiating a game in this matter is burdensome and prone to error. First, all of the players must be apprised of the host's IP address. In general, the host must inform each player of the host's IP address, unless the host uses a computer that is assigned to a static (i.e., permanent) IP address. For example, most game players connect to the Internet via a dial-up online Internet Service Provider (ISP), such as AMERICA ONLINE™, MSN™, COMPUSERVE™, EARTHLINK™, MINDSCAPE™, etc. Each of these ISPs has a fixed number of connections it can use simultaneously, with each connection being assigned to a unique, static IP address. In general, the number of connections (and thus IP addresses) is only a fraction of the number of customers to whom the ISP provides service. Accordingly, the ISPs use dynamic IP addressing schemes, whereby users are dynamically assigned to a connection (and the connection's corresponding IP address) upon logging onto the ISP, and the IP address of the connection is released for use by a subsequent user when the initial user logs off of the ISP. As a result, there is no way to assign a static IP address to users of ISPs of this type. Accordingly, the only way the players can be apprised of the host's IP address is for the host to let them know what the IP address is after it has been assigned, which is typically done through e-mail or via a phone call.

An improvement over the foregoing manual method is provided by online lookup services. In this instance, each member of the online lookup service is assigned a unique alias (i.e., user name) upon signing up for the service, wherein that user is always identified by the alias whenever the user logs onto the lookup service. In addition, upon logging on, the IP address for the user is matched to the user's alias so that the user's IP address can be accessed by application programs running on other computers through use of the alias. As a result, players can then search the online lookup service for the aliases of a host or hosts the players know are or will be hosting a game, wherein the IP addresses of those hosts is passed to the players (generally behind the scenes to an application program running on the player's computer). At this point, the players may still need to manually enter the IP address of the host in order to join the game.

Although the online lookup service scheme is an improvement over the manual method, it is still deficient in many respects. Notably, this scheme doesn't provide a convenient way to invite players to join games, wherein the invited players can decide whether they want to join the game. Additionally, the host must access multiple application programs and perform many steps in order to initiate a multiplayer game. Accordingly, it is desired to provide an improved scheme for enabling individuals to host multiplayer computer games and other players to join such games that overcomes the many limitations of the foregoing manual and online lookup service schemes.

SUMMARY OF THE INVENTION

In accordance with the present invention, a method and system is provided that addresses many of the foregoing limitations in the prior art. The method provides an easy way for players to host and join new instances of multiplayer online electronic games, as well as providing a scheme that enables players to join games that are already in progress. The method is implemented through a gaming utility that runs on each of the player's electronic devices (e.g., personal computers (PCs)) and interacts behind the scenes with an online messaging service. Game hosts are enabled to select players from a list of contacts provided by the online messaging service to invite to join a game, whereupon a selected game can be launched on all of the players' computers through a single command issued by the host. Additionally, the gaming utility provides players with a list of existing chat sessions being hosted by other players so as to enable the players to join games that are already in progress.

According to a first aspect of the invention, a method is provided for enabling a host player to select one or more players to participate in a multiplayer online electronic game performed over a communications network, such as a local area network (LAN), or the Internet, through use of a user interface provided by the gaming utility and behind the scenes interaction between the gaming utility and the online messaging service, preferably MSN™ messenger services. Upon logging onto MSN™ messenger services and launching the gaming utility, the host and other players are provided with a respective list of chat contacts each of them has built through direct entry using MSN™ messenger services or indirect entry using the gaming utility. An availability status, which may be selected by each player or automatically determined by MSN™ messenger services, is provided for each contact so as to indicate which contacts are presently available for participating in a game. In addition, a list of chat sessions that are currently being hosted by contacts in the player's list of contacts is provided so as to enable the player to join an existing chat session.

Any player can host a chat session by opening a new chat session and selecting other players in their contact list to invite to join the chat session. As each player is selected by the host, an electronic invitation is sent to the player informing him that he has been invited to a chat session hosted by the host. Preferably, the electronic invitation includes both a model dialog box and an audible announcement that is heard over the headphones of a headset that is preferably worn by each player. The headset additionally includes a microphone and is operatively coupled to the player's computer through a channel controller device. In response to receiving the invitation, each recipient may select to join or decline the chat session by clicking on a corresponding button in the dialog box. Optionally, the recipient may toggle his channel controller device to a command and control mode and speak "Yes" or "No" into the his microphone$_{[AB1]}$. The channel controller device also enables each chat session participant to control which other participants can hear their voice, and includes an "All" channel button that enables all of the participants to hear each other, thereby enabling the chat session participants to agree on a game they would like to play, and when the game should be started. In addition, each of the players are provided with a list of multiplayer online games they can automatically launch based on a gaming profile for each player. After a desired group of players has joined the host in the chat session and agree on a game to play from among the games in their lists, the host can automatically launch an instance of the selected game on each of the players' computers, thereby enabling the players to participate in the game. In addition to enabling players to join the game in the foregoing manner, the host is also provided with an IP address for his machine so as to enable other players who are not in the host's list of contacts to join the game.

Another aspect of the present invention is directed to a system that implements the steps of the method discussed above. The system includes a processor and memory for storing machine instructions executed by the processor to implement functions generally consistent with the steps of the method. In addition, a computer readable medium comprising a plurality of machine instructions is provided that performs the method when the machine instructions are executed by the processor.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
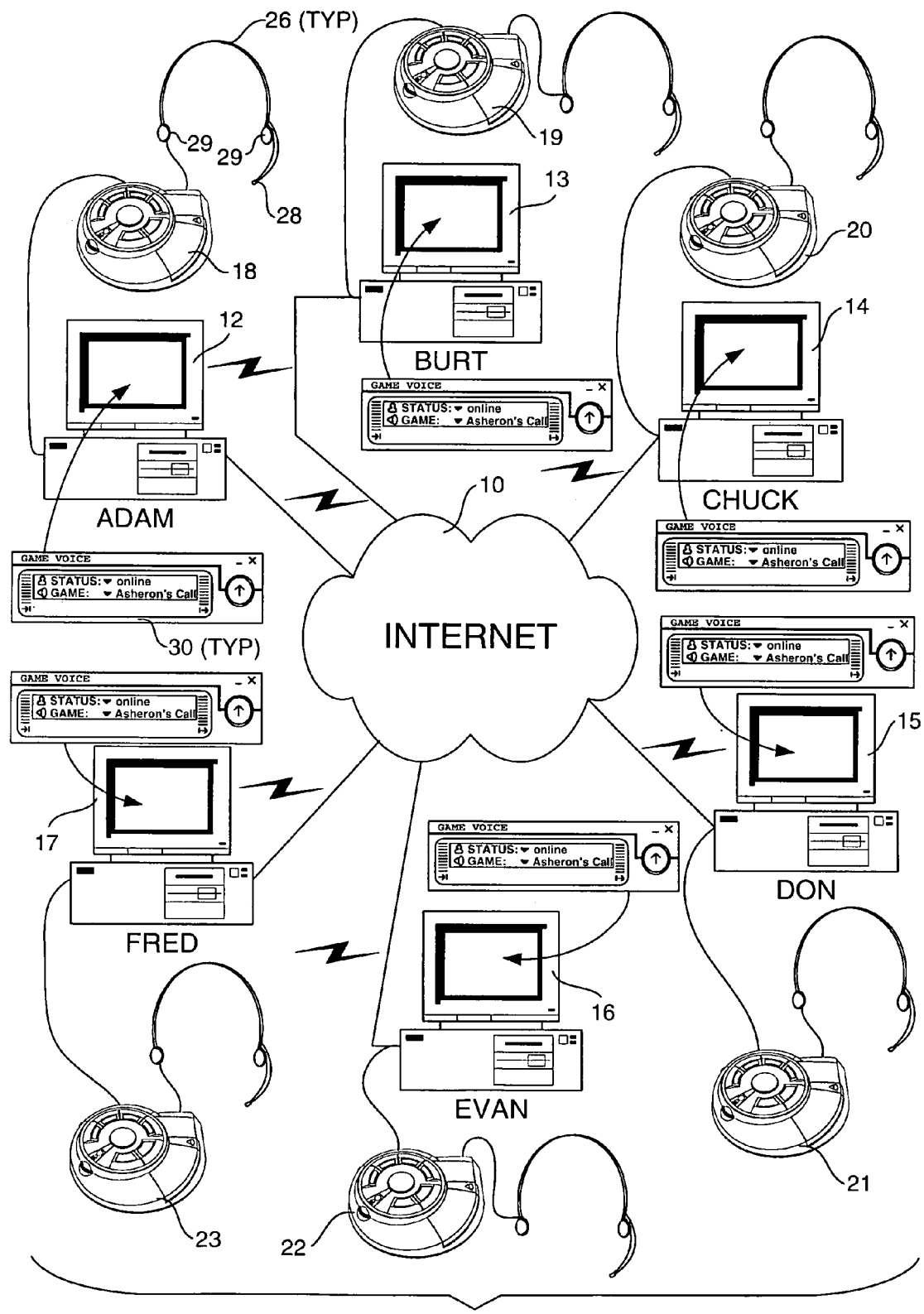
FIG. 1 is a schematic diagram illustrating an exemplary network environment for implementing the present invention over the Internet.
Figure 2:
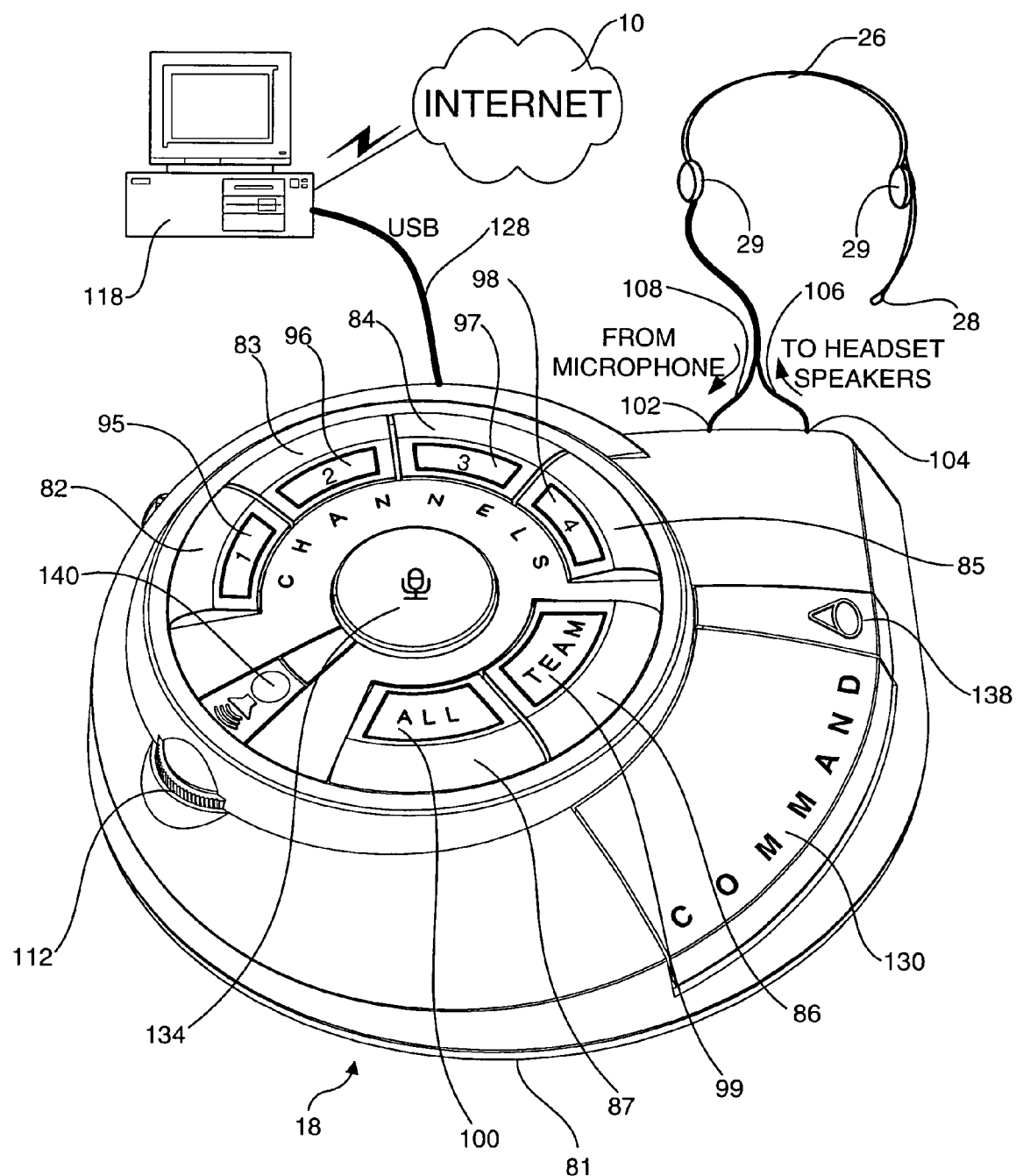
FIG. 2 is an isometric view of a personal computer (PC), a headset, and a channel controller device that is used by a player to select other players who will hear the player speak.
Figure 3:
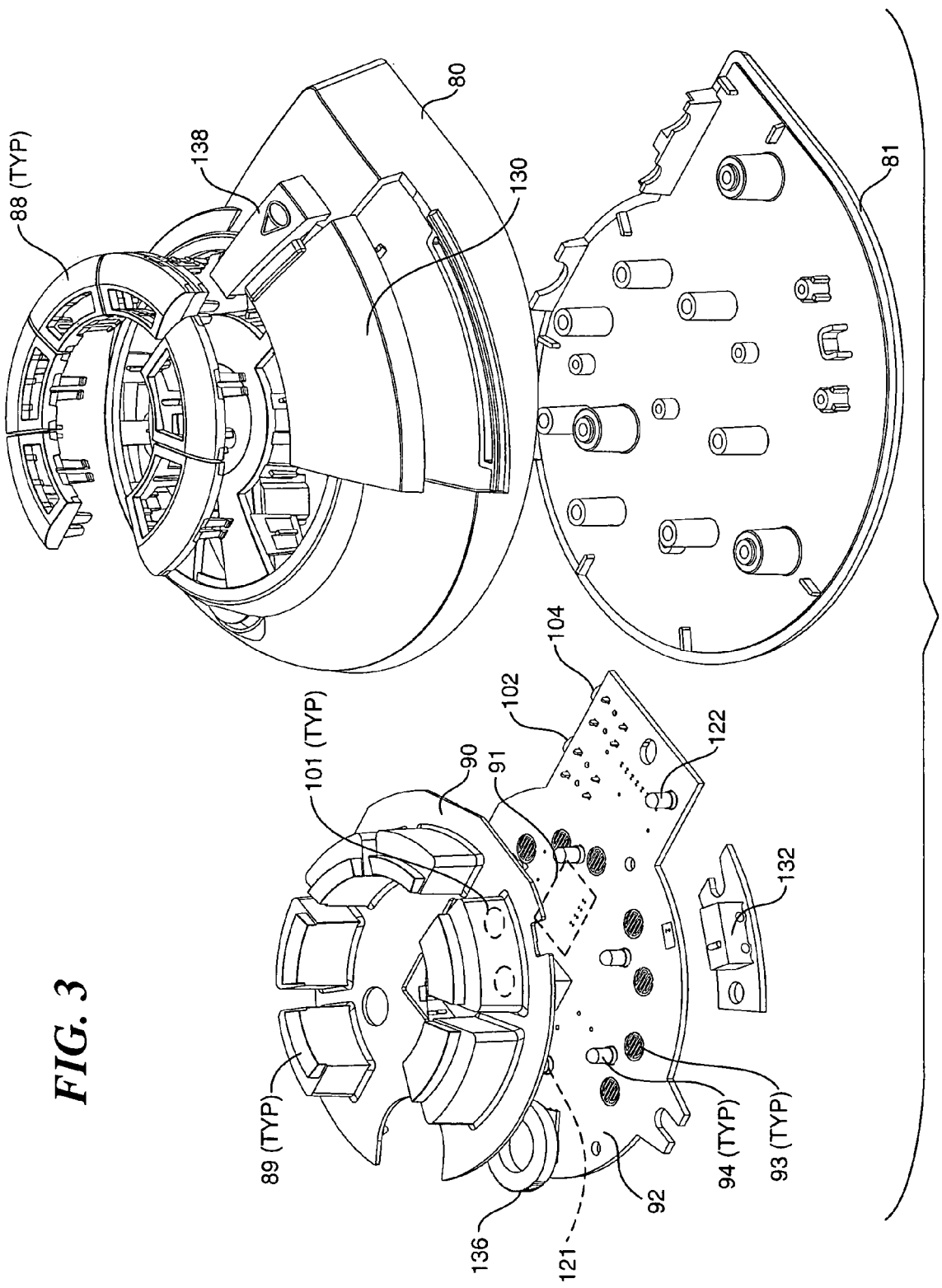
FIG. 3 is an exploded isometric view of the channel controller device of FIG. 2.
Figure 4:
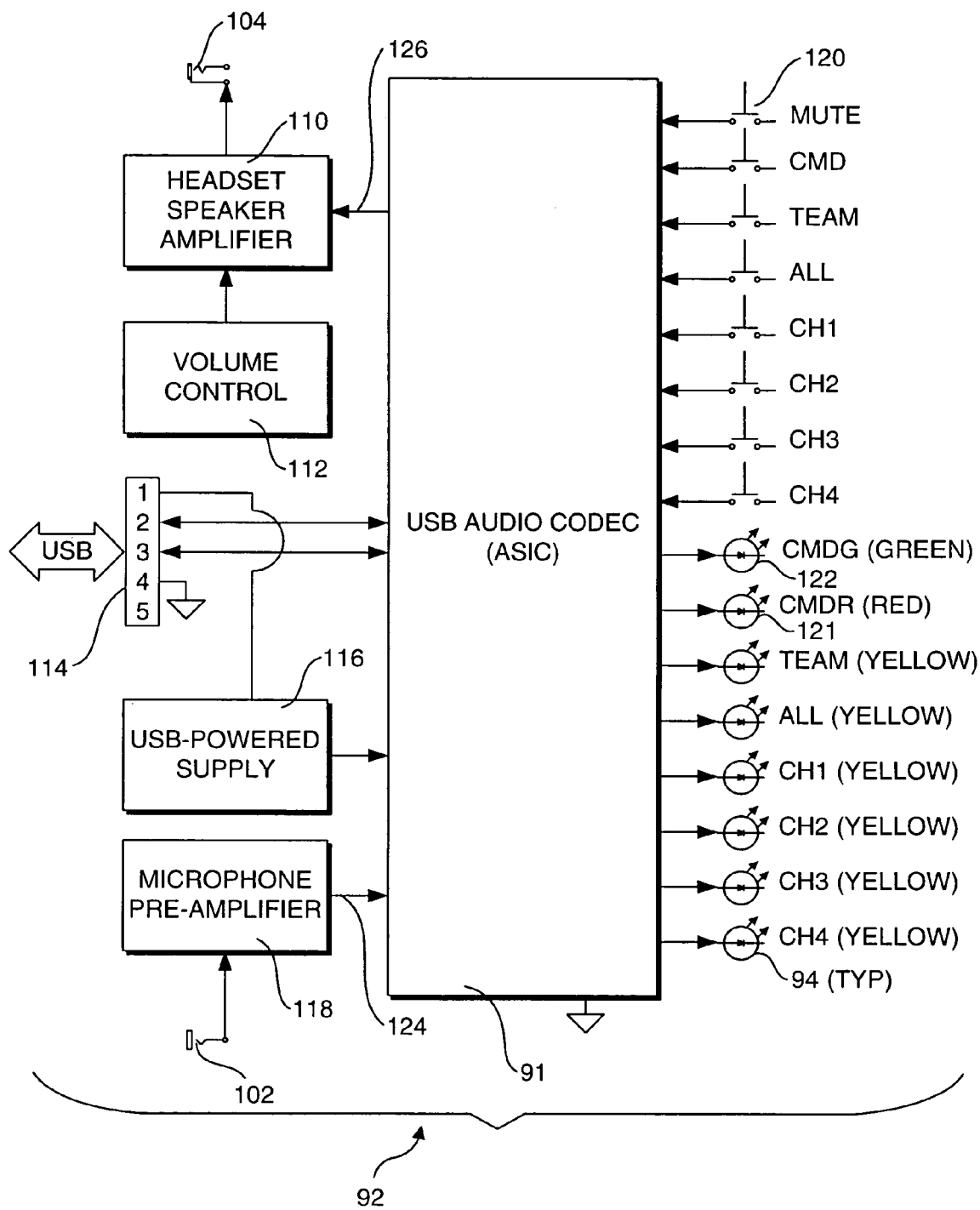
FIG. 4 is an electrical schematic diagram of the circuitry in the channel controller device employed for implementing the various functions that it provides.

An exemplary configuration of an online gaming environment that is suitable for application of the present invention is shown in FIG. 1. Online gaming environments enable a plurality of players to participate in an online game over a communications network such as Internet 10. Each participant operates a respective one of PCs 12, 13, 14, 15, 16, and 17 that executes software code for performing game functions and which is connected to Internet 10. In the exemplary configuration, these participants include players identified by the fictitious names Adam, Burt, Chuck, Don, Evan, and Fred, each of whom is operating a different one of the PCs. For convenience, each of PCs 12–17 is labeled with a respective participant's name. Each of PCs 12, 13, 14, 15, 16, and 17 are connected to a different corresponding channel control device 18, 19, 20, 21, 22 and 23, further details of which are shown in FIGS. 2–4 and discussed below. Each of the channel control devices is further connected to a corresponding different headset 26, which includes a microphone 28 and headphones 29, worn by each of the players, to enable them to communicate with one another during a chat session.

Each of PCs 12, 13, 14, 15, 16, and 17 is also linked in communication with Internet 10, and executes machine instructions that implement the functions of one or more multiplayer online computer games. In addition, each of the PCs is executing (or is able to execute) a gaming/chat utility application 30 (hereinafter referred to simply as a "gaming utility 30") that is used to control gaming and voice chat functions in accord with the present invention.

Preferably, each of the players will initiate a gaming or chat session in the following manner. The player will connect to Internet 10 (if not already connected thereto), and will log onto the MICROSOFT NETWORK (MSN) Messenger Service™ (hereinafter referred to as "MSN messenger"), an online instant message service provided by the Microsoft Corporation. Preferably, each of the players will have built a contact list through functions providing by MSN messenger comprising a list of persons with whom the player prefers to chat and who also use MSN messenger. As typically implemented, this contact list enables a user of MSN messenger to perform text chat sessions with one or more persons listed in the user's contact list.

Figure 5:
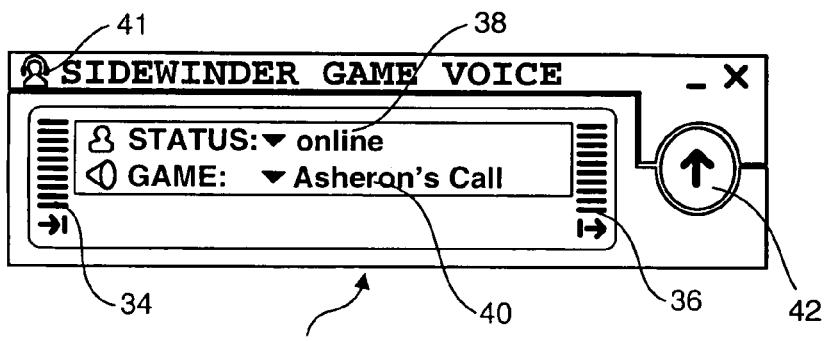
FIG. 5 is a representation of a collapsed user interface frame a player sees following an initial installation and launching of a gaming utility in accord with the present invention.

After logging onto MSN messenger, the player will launch an instance of gaming utility 30. Optionally, as an alternative to first connecting to MSN messenger, upon launching gaming utility 30, the user may be automatically connected to Internet 10 (or prompted to do so), if not already connected, and/or to MSN messenger by internal functions provided by gaming utility 30. As shown in FIG. 5, the initial user interface (UI) of gaming utility 30 comprises an expandable UI Frame 32, which is shown in a collapsed form in this Figure. In its collapsed form, UI Frame 32 includes a left VU meter 34, which graphically displays a relative volume level of an audio signal used to drive headphones 29 of the headset 26 worn by the player, and a right VU meter 36, which graphically displays a relative volume level of audio signals picked up by microphone 28 on the player's headset 26, during a voice chat session. Additionally, UI Frame 32 includes an availability status pull-down control 38 that enables each player to provide an MSN messenger availability status to other players who are logged onto MSN messenger, and a game command set pull-down control 40 that enables each player to select a desired game command set from a list of game command sets defined in a gaming profile for the player. UI Frame 32 additionally includes a system menu that is activated by clicking on a system menu icon 41.

Initially, the MSN messenger availability status of a given player will be "online" if the player has logged on MSN messenger prior to launching gaming utility 30, or offline if the player has not yet logged on MSN messenger. Additionally, the default game command set listed on game command set pull-down control 40 will correspond to the game command set the player last used (or is currently using), while a pull-down list (not shown) that is displayed in response to activation of game command set pull-down control 40 will include the list of game command sets defined by the user's gaming profile.

Figure 6:
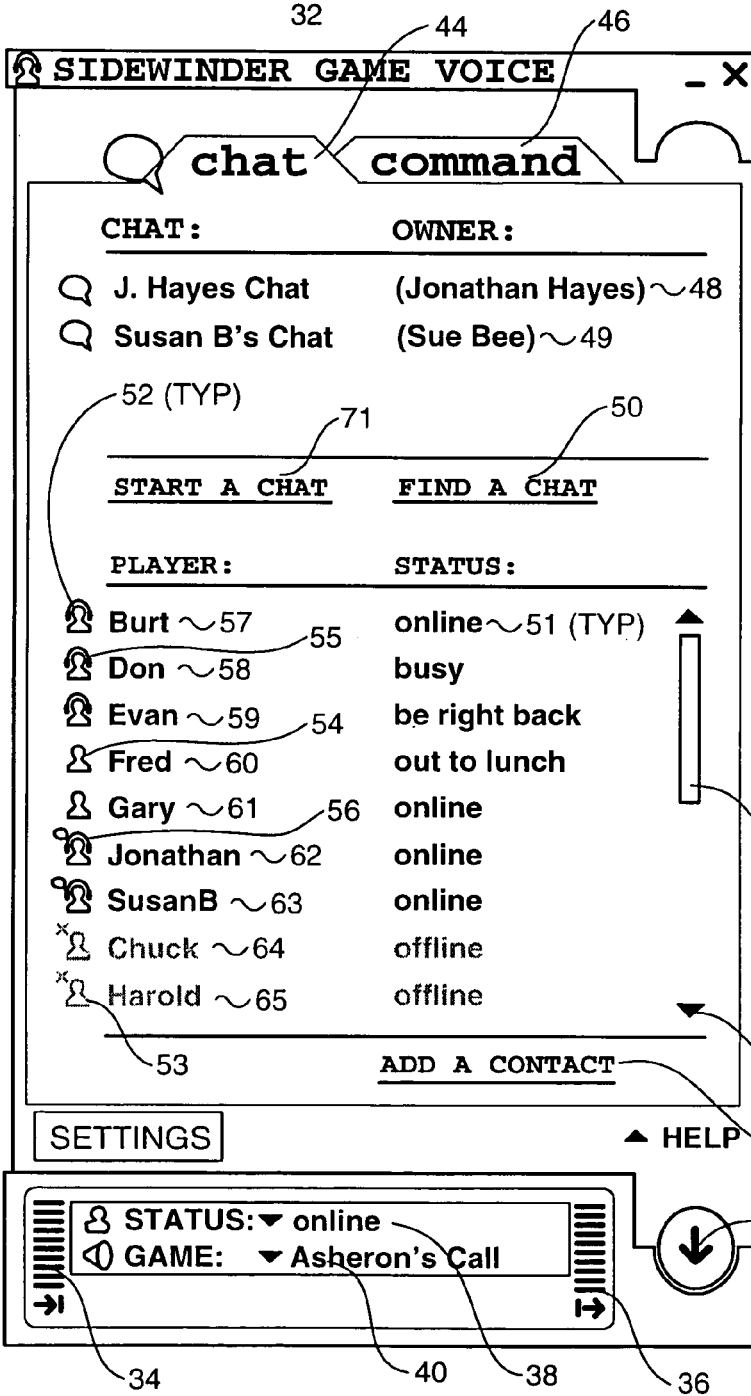
FIG. 6 is a representation of the user interface frame of FIG. 5 when expanded.

Typically, a player will want to initiate or join a game or a voice chat session. Accordingly, the player will activate an expansion control 42, which will cause UI Frame 32 to expand to its expanded configuration, as shown in FIG. 6. In the expanded configuration, UI Frame 32 includes a primary pane comprising a chat pane 44 or a command and control pane 46; either of these two panes can be activated and displayed (one at a time) by clicking on the pane's corresponding tab (i.e., by clicking on the "chat" or "command" tab) at the top of each pane. Chat pane 44 is the default pane that is displayed when gaming utility 30 is initially installed and launched, and provides information to each player concerning existing chat sessions the player may join and the availability status of persons in the player's MSN messenger contact list. After the initial launch, the primary pane that will be displayed is the last pane that was displayed before the gaming utility was closed.

At a top portion of chat pane 44, a list of presently active chat sessions that are being conducted over the network or networks into which the player is connected will be displayed, such as a chat session 48 hosted by a Jonathan Hayes and a chat session 49 hosted by a Sue Bee, as shown in FIG. 6. In general, the list of presently active chat sessions will include chat sessions that: (a) are hosted by a person in the player's chat contact list; (b) active over the same network or networks to which the player is connected; and (c) either an open chat session (i.e., a chat session that anyone may join) or chat sessions the player has been invited to join. For instance, if the player is logged onto a local area network (LAN), the displayed chat sessions will include all of the chat sessions hosted by persons in the player's contact list who are presently hosting a chat session on the LAN that include either an open invitation to all other players, or an invite-only list that includes the player. Similarly, if the player is logged onto Internet 10, the displayed chat sessions will include all of the chat sessions hosted by persons in the player's contact list who are presently hosting a chat session on Internet 10 that includes either an open invitation to all other players or an invite-only list that includes the player. Furthermore, the foregoing holds true for players that are simultaneously connected to a LAN and the Internet or other networks—i.e., the list of chat sessions will include appropriate contacts who are hosting chat sessions on both the Internet and the LAN and/or other networks.

A player can join one of the listed chat sessions by simply clicking on it. For example, clicking anywhere on the line corresponding to chat session 48 will enable the player to join the chat session hosted by Jonathan Hayes. Accordingly, only open chat sessions and chat sessions to which the player has been invited are displayed. Upon joining a chat session, the player will be automatically assigned to a chat channel as described below.

In addition to being able to join listed chat sessions, the player may join a chat session known to the player, but hosted by a person who is not logged onto MSN messenger, by activating a "Find a chat" hyperlink 50, which will launch a dialog in which the player may enter an IP (Internet Protocol) address of the known chat session. The player will be joined to any chat session that is being hosted on a computer at the entered IP address.

A list of MSN messenger contacts for the player will be displayed in a lower portion of chat pane 44. A respective MSN messenger status 51 will be listed to the right of each contract, while a respective gaming utility status icon 52 will be displayed to the left of each contract. MSN messenger maintains a contact status for each member of its messaging service, which is accessed behind the scenes by gaming utility 30 to generate the MSN messenger statuses in the list, as follows. The gaming utility implements a light weight (almost stateless) protocol on top of MSN messenger's text transport protocol. A set of messages exists such that the gaming utility can discover which of the player's contacts are logged onto the computer network, logged into MSN messenger, and running the gaming utility on their own computers. Each contact is perceived to be in one of the following states.

Offline: Contact is not online with MSN messenger; indicated by a lightened name, a lightened "offline" MSN messenger status, and a gaming status comprising lightened base icon with an adjacent "X," as shown by an icon 53.

Messenger Online: Contact is online with MSN messenger, but is not running the gaming utility; contact's MSN messenger status is listed as online (or with contact's manually selected status—see below), and the gaming utility status is displayed as a darkened base icon, as shown by an icon 54.

Game/Chat Online: Contact is online with MSN messenger and is running the gaming utility; contact's MSN messenger status is listed as online (or as contact's manually selected status), and the gaming utility status is displayed as a darkened base icon with headset, as shown by an icon 55.

In-Chat: Contact has joined a voice chat session with the gaming utility; contact's MSN messenger status is listed as online (or as contact's manually selected status), and the gaming utility status is displayed as a darkened base icon with headset and chat balloon, as shown by an icon 56.

Hosting: Contact is hosting a voice chat session with the gaming utility; contact's MSN messenger status is listed as online (or as contact's manually selected status), and the gaming utility status is displayed as a darkened base icon with headset and chat balloon (i.e., as icon 56).

Hosting/Locked: Contact is hosting a private session with the gaming utility; status indications are the same as for Hosting.

As indicated above, the MSN messenger status for a given contact will be either the automatically determined status of the player, either online or offline, or a status that is manually set by the contact, which overrides the automatically determined status. Manually selected statuses include "online," "busy," "be right back," "away," "on the phone," "out to lunch," and "appear offline." As the last entry listed implies, if a contact has selected the status of "appear offline," that person will appear to be offline to other players, even though the player is logged onto MSN messenger.

As discussed above, when the gaming utility is launched, it will log the player onto MSN messenger if the player has not already done so. Next, the gaming utility will acquire the player's contact list from MSN messenger. The messenger component of the gaming utility will then initiate status queries to each online contact. The contact list in UI Frame 32 will then become populated as the status of each player is determined.

In the following discussion, it is assumed that Adam is going to be a host player of a multiplayer online computer game and will be soliciting other players to participate in that game. As shown in FIG. 6, an exemplary set of contacts corresponding to player Adam's contact list is displayed on chat pane 44. These contacts include players Burt 57, Don 58, Evan 59, Fred 60, Gary 61, Jonathan 62, Susan B. 63, Chuck 64, and Harold 65. The names in a contact list will be the MSN messenger user names (i.e., aliases) for those contacts. Typically, these names will comprise "handles," shortened name forms, or nicknames rather than full actual names, although the latter may be used if so chosen by the contact. If the contact list exceeds the available display area, additional contacts (and their corresponding statuses) may be viewed by dragging the slider on a scroll bar 66 or activating a scroll-down control 67.

Figure 7:
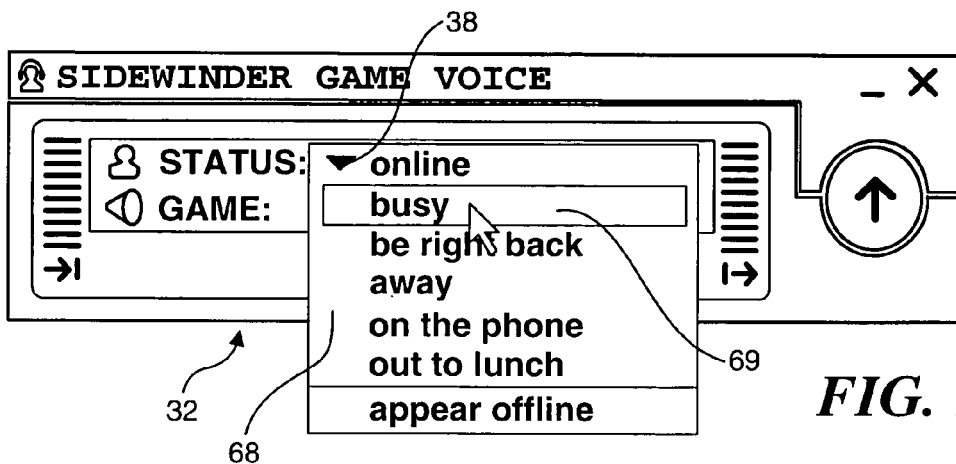
FIG. 7 is a representation of an activation of a pull-down control in the user interface frame that is used to enable a player to change the player's availability status.

As discussed above, the availability status for each contact is determined as a function of the state perceived by MSN messenger, including those statuses that are manually set by the contact. In addition to being able to manually select an availability status with MSN messenger, a player can manually change the availability status by activating availability status control 38, as shown in FIG. 7, enabling the player to select an availability status from a pull-down list 68, which includes a "busy" status 69.

Preferably, the contact list will be sorted in the following manner. First, contacts who are logged on and are running an instance of gaming utility 30 will be listed first in alphabetical order, based on their MSN messenger user name. Next, contacts who are logged on but have yet to activate (or do not have) the gaming utility will be listed alphabetically by user name. Finally, contacts who are presently not logged on are listed at the bottom of the list, alphabetically by user name.

A player may desire to add a new contact to the list of contacts. To do so, the player activates an "add a contact" hyperlink 70, which automatically opens MSN messenger's "add contact" wizard. After adding a new contact, the contact list will be updated to include the new contact and the new contact's present availability status.

Figure 8:
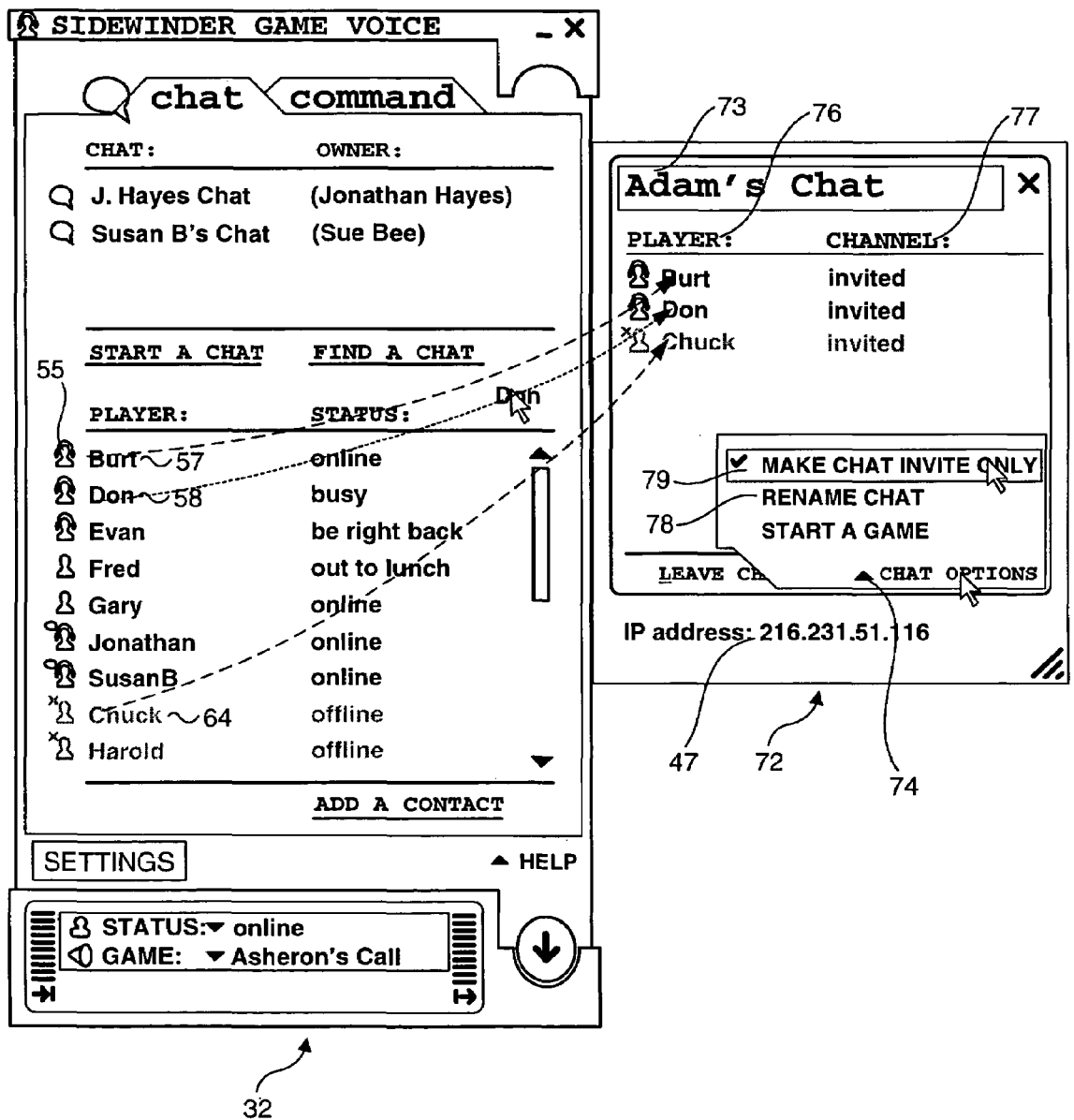
FIG. 8 is a representation of the user interface frame and a chat room pane that is displayed upon opening a new voice chat session, illustrating a method used to invite a player's contacts to join the voice chat session.

Initiation of a chat session can be accomplished in one of two ways. According to a first method, a new chat session is initiated when a user activates a "start a chat" hyperlink 71, which causes a chat room pane 72 to be displayed adjacent to UI FRAME 32, as shown in FIG. 8. A default chat name appears in a title box 73, comprising either the last chat name used by the player or "<contact name>—Chat." This default chat name may be edited by the player by activating a "Chat Options" control 74 and selecting a "Rename Chat" menu option 78.

Whenever a chat room pane is opened, a list of players presently participating in the chat session (the player viewing the chat room pane is never shown, since that player is an implied participant) will be displayed in a "Player:" column 76, along with a channel assignment or invite status under a "Channel:" column 77. If the player viewing the chat room pane is the host of a chat session, the player will be able to see a list of all of the present participants and players that have been invited to join that chat session. If the player is not hosting the chat session, that player will only see the names of the present participants. Initially, the list of chat participants for a new chat session will be blank, since no contacts have been invited to join the new chat session at this point.

Figure 9:
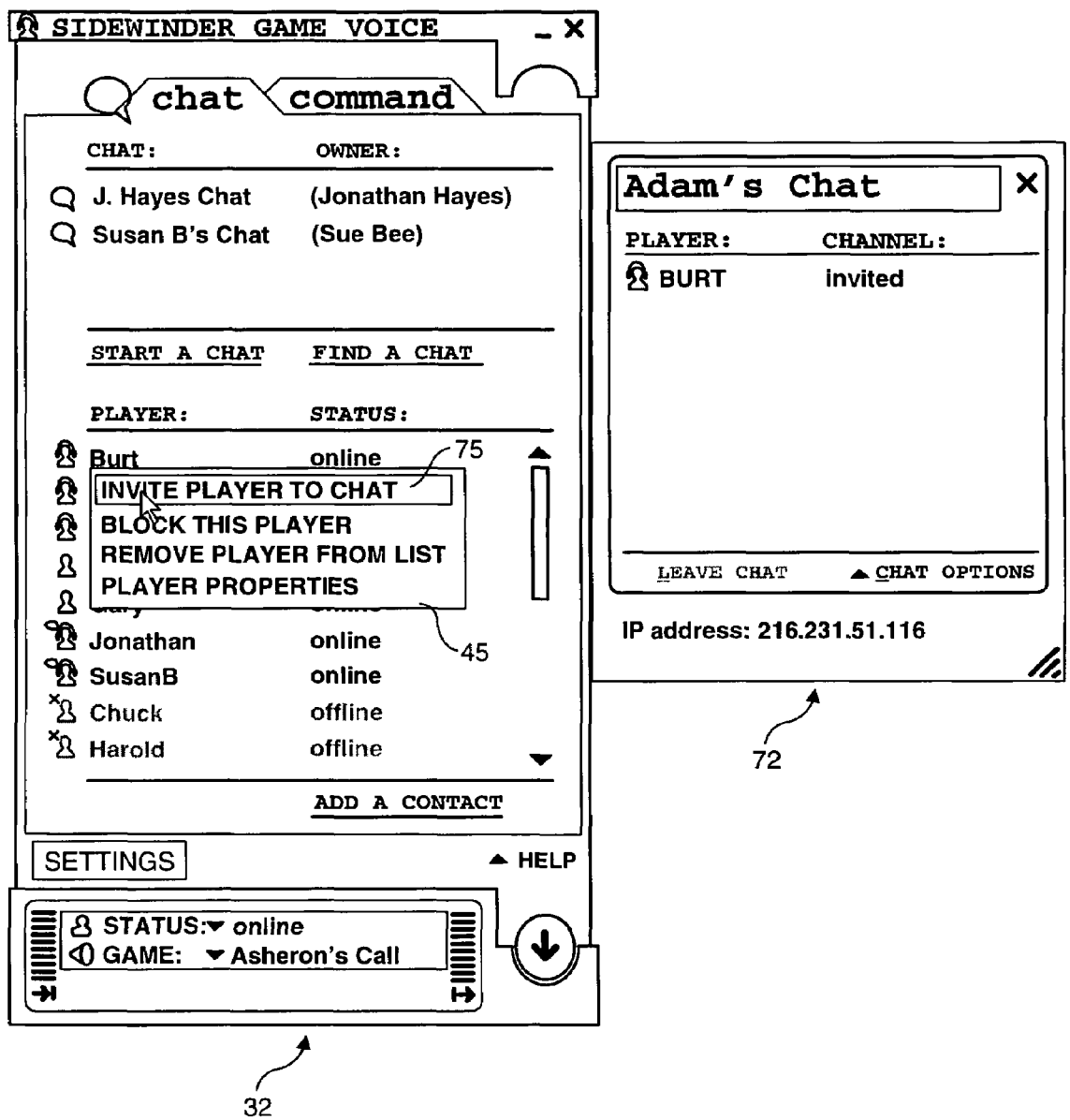
FIG. 9 is a representation showing an activation of a context menu in the user interface frame, for inviting a contact to join a voice chat session.

In order to host a chat session that enables the session participants to communicate with one another via the voice chat capabilities provided by gaming utility 30, it is necessary to select one or more players in the contact list who the host would like to have participate in the chat session. For example, suppose a player (e.g., Adam) would like to host a chat session that is to initially include Burt 57, Don 58, and Chuck 64. This process can be accomplished in one of three ways. Adam can: (a) double click on each contact he would like to invite to the chat session; (b) drag the desired contacts onto chat pane 72, such as shown in the Figure; or (c) select one or more contacts, activate chat pane 44's context menu, and selecting an appropriate option to invite the contact or contacts. When using a mouse, activation of chat pane 44's context menu can be performed by the mouse cursor over a contact name and activating the left or right mouse button or pressing the space bar on the PC's keyboard, bringing up a context menu 45, as shown in FIG. 9, from which the player can select to invite the player to join the chat session by choosing a "Invite player to chat" option 75. Note that this approach represents an alternative way to initiate a chat session—i.e., if a chat session has not been started, selecting a player to invite to a chat session in this manner will automatically open a new chat session.

When a player is initially invited to the chat session, the player's contact name will be displayed in chat pane 72, along with the gaming utility status icon of the player and an "invited" channel assignment status. If the invited contact has yet to log on, the contact's name and the word "invited" are lightened.

If an invited contact has a current MSN messenger status of "online" and is running an instance of gaming utility 30, the contact will receive an invitation message causing a modal dialog to appear on the contact's screen inviting the contact to join the initiator's chat session. In addition, the contact will receive a verbal invitation over the speakers of his headset. For example, of the three players (Burt, Don, and Chuck) invited by Adam in the foregoing example, Burt is the only contact that has an MSN messenger availability status of "online," and a gaming utility availability status icon 55 indicating that Burt is running an instance of gaming utility 30. This status icon means that Burt is presently logged on to Internet 10 and MSN messenger, is running the gaming utility, and has not selected an availability status that indicates he is unavailable. Accordingly, a modal dialog (not shown) will pop up on Burt's PC 13 displaying an invitation message reading "Adam invites you to join Adam's chat," with accept and decline button options. In addition, Burt will receive an audio message conveying the same invitation message over headphones 29 of Burt's headset 26, followed by "accept?" This function is made possible through a text-to-speech (TTS) capability of the command and control features provided by the gaming utility and hardware functions implemented in Burt's channel controller device 19. In response to receiving the invitation, Burt may select to join or decline the chat session by clicking on a corresponding button in the dialog box. Optionally, a recipient can accept or decline an invitation by toggling his channel controller device to a command and control mode and speaking "Yes" or "No" into the his microphone. Further details of how these functions are handled are disclosed in co-pending application Ser. No. 09/515,559, entitled "ENABLING SEPARATE CHAT AND SELECTIVE ENABLEMENT OF MICROPHONE," filed on Feb. 29, 2000, the disclosure and drawings of which are hereby specifically incorporated herein by reference.

All chat sessions are initially "open" chat sessions by default. An open chat session enables anyone to join the session, including both invited contacts and other players who are made aware of the existence of the session. For example, open chat sessions hosted by contacts in a player's contact list will be displayed in an upper portion of chat pane 44, as discussed above. In many instances, a chat session host may wish to limit the chat session to only include the contacts the host has invited to join the session. The host can select this option by activating "Chat Options" control 74, and selecting a "Make Chat Invite Only" control 79 to toggle a checkmark disposed adjacent to the option on, converting the chat session to an invite-only session. In accordance with the host selecting the invite-only option, each player will hear, "<Host Name> made chat room invite only" in their invitation announcements.

In some instances, it may be desired to invite people to join a chat session who do not use MSN messenger. This action can be accomplished by informing them of the IP (Internet Protocol) address from which the chat session is hosted (typically by an e-mail or telephone invitation). Such an address is displayed as an IP address 47. As discussed below, this address will only appear in the chat room pane of the host, and will not appear in the chat room panes of the other chat participants. Upon joining a chat session in this manner, each participant will be assigned an automatically determined user name.

As each player joins a chat session, the player is automatically assigned to a next available chat channel. Optionally, a host may pre-assign chat channels to invited contacts. Additionally, each player may reassign his own chat channel assignments. In order to better understand the purpose for assigning channels, and how such channel assignments can be used to a player's advantage, a discussion of the channel controller device's construction and use is now presented.

With reference to FIGS. 2–4, channel controller device 18 (identical to channel controller devices 19–23) enables a player to communicate with one or more other players by selectively activating a plurality of chat channels that have been assigned to those players. Each chat channel is an independent or private voice data channel that enables voice communication between the player and the other player or players that are selectively assigned to that chat channel. For example, players often form teams to participate in online multi-player games, wherein all the players on a team may wish to discuss strategies by talking on a "team channel." Alternatively, individual players on a team may wish to communicate with one another on individual channels so that their communications are not overheard by other players not assigned to those channels. Accordingly, channel controller device 18 includes a plurality of buttons disposed within a housing 80 that is coupled to a base 81. The buttons, which are pressed to selectively activate respective chat channels, include a first channel button 82, a second channel button 83, a third channel button 84, a fourth channel button 85, a "team" button 86, and an "all" button 87.

As shown in FIG. 3, each channel button comprises a key 88 that is disposed over a corresponding membrane switch dome 89 formed in a membrane switch sheet 90 that is fabricated from a silicone polymer. Each of membrane switch domes 89 includes a pair of conductor disks 101 (only shown for one switch dome) that are disposed adjacent to the base of the dome. Membrane switch sheet 90 is disposed above a circuit board 92 that includes a plurality of membrane switch conductor pads 93, which are disposed opposite corresponding conductor disks 101 when assembled. Each membrane switch conductor pad 93 comprises a pair of conductor traces that form an incomplete electrical circuit, i.e., an open switch. As a player presses down a key 88 to select or deselect a particular chat channel, a corresponding membrane switch dome 89 is caused to flex, causing one or both of conductor disks 101 for the membrane switch dome to contact adjacent switch conductor pads 93, thereby completing one or both of the electrical circuit (i.e., closing the switch) corresponding to the switch conductor pad(s) 93 that is (are) contacted by the conductor disks. This switch closure is sensed by an application specific integrated circuit (ASIC) 91 disposed on the underside of circuit board 92. The ASIC toggles the channel between an active and inactive state in response to sensing the switch closure.

When a channel is on (i.e., activated), a corresponding light emitting diode (LED) 95 mounted to circuit board 92 and disposed within a membrane switch dome 89 corresponding to the channel is energized to indicate the channel has been selected by the player. In this manner, a plurality of channel activation indicators are provided, including a first channel indicator 95, a second channel indicator 96, a third channel indicator 97, a fourth channel indicator 98, a team channel indicator 99, and an "all" channel indicator 100, each of which is enunciated by a different one of the LEDs 94.

A lead 106 from headphones 29 on headset 26 is electrically connected to an audio output jack 104, while a lead 108 from microphone 28 on the headset is connected to an audio input jack 102 on each channel controller device, at the back of housing 80. Audio input jack 102 and audio output jack 104 are mounted on circuit board 92. It should be noted that a single multi-terminal jack can alternatively be employed for input and output audio data on the channel controller device, if desired. The headphones thus receive audio chat data (voice messages) from other players, while the verbal chat messages spoken by the player wearing the headset are picked up by the microphone on the headset and conveyed to the other one or more players selected by the player, as determined by the one or more keys 88 on the channel controller device the player has activated.

As shown in FIG. 4, the primary functional components of circuit board 92 include ASIC 91, a headset speaker amplification circuit 110, a volume control 112, a USB connector 114, a USB-powered supply circuit 116, a microphone pre-amplification circuit 118, a plurality of input switches 120, a plurality of yellow channel indicator LEDs 94 corresponding to individual channels 1–4 and the "team" and "all" channels, a red mute LED 121, and a green command and control LED 122.

ASIC 91 includes audio processing circuitry that comprises appropriate signal conversion and CODEC (encoding/decoding) components for processing a pre-amplified microphone input signal 124 and a pre-amplified headset speaker output signals 126. Microphone 28 produces an analog signal having a frequency and an amplitude corresponding to the sound incident on the microphone and thus indicative of a verbal chat message spoken by a player into the microphone. Accordingly, circuitry is provided for converting the analog signal into a digital format (e.g., an analog-to-digital converter), and encoding the signal so it can be more efficiently transmitted over a communications link. A preferred communications link comprises a Universal Serial Bus (USB) interface 128 that connects channel controller device 18 to a player's PC, e.g., Adam's PC 12. The PC converts the USB formatted signal into packets appropriate for transmission over the network. Circuitry for performing the reverse function is also provided to enable another player's voice to be replicated by headphones 29. In this instance, packets conveying an encoded audio signal are transmitted from one of the other player's PCs to PC 12 over Internet 10. The encoded audio signal is then transmitted via USB interface 128 to the channel controller device and the decoder/converter portion of ASIC 91 first decodes the encoded signal and then converts the decoded signal from a digital format into an audio signal that is output as pre-amplified headphone signal 126, which is then amplified by headphone amplifier 110 to drive headphones 29.

Channel controller device 18 further includes a command and control button 130 that actuates a toggle switch 132 mounted to base 81, a mute button 134 operatively coupled to a mute toggle switch (not shown), and a volume control knob 136, that is coupled to volume control 112. Actuation of command and control button 130 toggles the player between a voice chat mode and a command and control mode, thereby enabling the player to direct the verbal data for chat purposes or for game control purposes. When used for game control purposes, a speech recognition module included in gaming utility 30 is employed to convert spoken commands into defined control actions that implement secondary control functions in the game. When in a command and control mode, a translucent voice chat indicator panel 138 is lighted by green command and control LED 122, which is disposed beneath the indicator panel. When in a voice chat mode (for voice communication over one of the chat channels), voice chat indicator panel 138 is not lighted. Activation of mute button 134 mutes microphone 28 so as to enable a player to talk to other persons in the same room as the player or connected through a different communication link such as a telephone, without transmitting any of the voice data acquired by microphone 28 to the other players, or to avoid having the voice data interpreted as voice commands (when the channel controller device is in the command and control mode). While microphone 28 is muted, a mute indicator 140 is lighted by red LED 121, which is mounted on circuit board 92 and disposed beneath mute indicator 140. Additionally, rotation of volume control knob 136, which is coupled to volume control 112, enables the player to control the level of the sound produced at headphones 29.

The various voice chat channels may be assigned in one of several ways, including: (a) pre-assignment through the gaming utility UI; (b) automatic assignment; and (c) manual reassignment through the gaming utility UI. Generally, players will choose to have their voice chat channels automatically assigned, as follows.

In general, as each contact joins a chat session, the new contact is assigned to the next available channel, beginning with channel 1 for the first contact to join the host in a chat session. As discussed below, new contacts will be added to the "all" channel when individual channels 1–4 have already been assigned, and that each contact that is assigned to one of channels 1–4 is assigned to the "all" channel at the same time. Also, each player will be verbally notified by a computerized voice over the player's headset speakers 29 of the channel assignments for that user as each player is added to the chat session, and corresponding channel indicators will be enunciated on each player's channel controller device.

Figure 10:
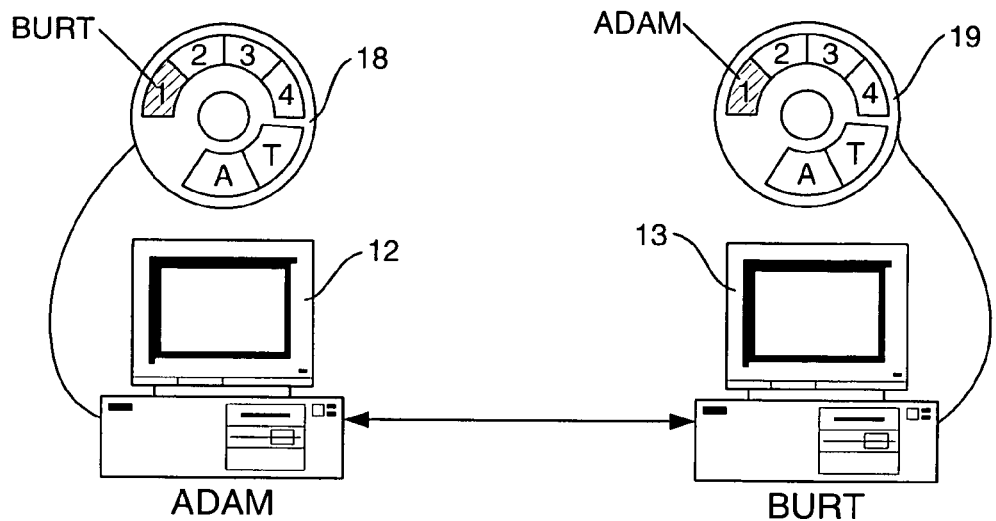
FIG. 10 is a schematic diagram illustrating an automatic assignment of a chat channel when a first player joins a voice chat session hosted by another player.

If upon receiving the invitation to join Adam's chat session, Burt decides to accept the invitation, Burt is automatically assigned to the first channel of Adam's channel controller device 18, while Adam is automatically assigned to the first channel of Burt's channel controller device 19, as shown in FIG. 10. Additionally, Adam will hear the message, "Burt connected on one", while Burt will hear the message, "Adam connected on one" on the headphones of their respective headsets 26. In addition to assigning the first channel on both of Adam and Burt's channel controller devices 18 and 19 in this manner, the first channel indicators 95 on each of the channel controller devices will become lighted. (Note that in this and the following Figures, cross-hatching of a channel indicator is used to indicate that the channel indicator is lighted.) A lighted channel indicator means the corresponding channel is active for sending voice data to the contact or contacts assigned to that channel.

Figure 11:
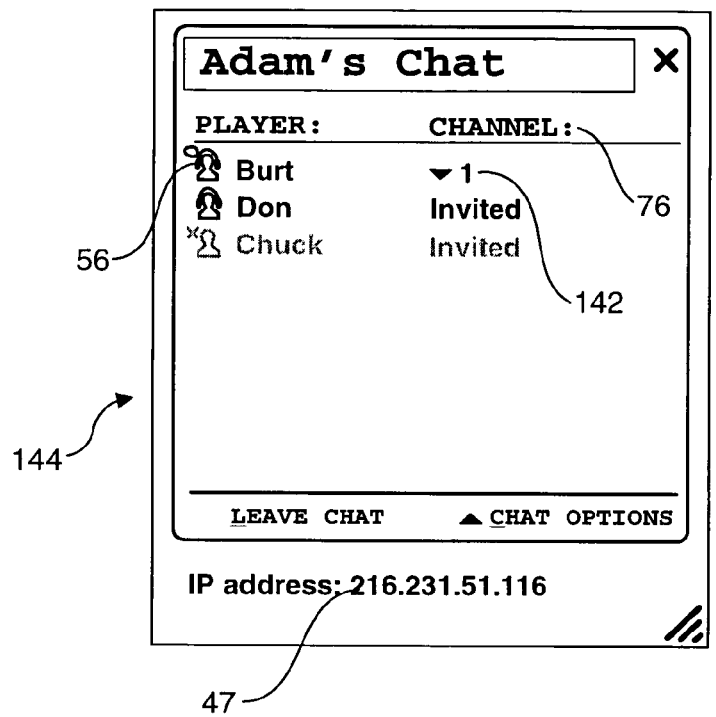
FIG. 11 is a representation of an exemplary chat room pane displayed to a player hosting a chat session.
Figure 12:
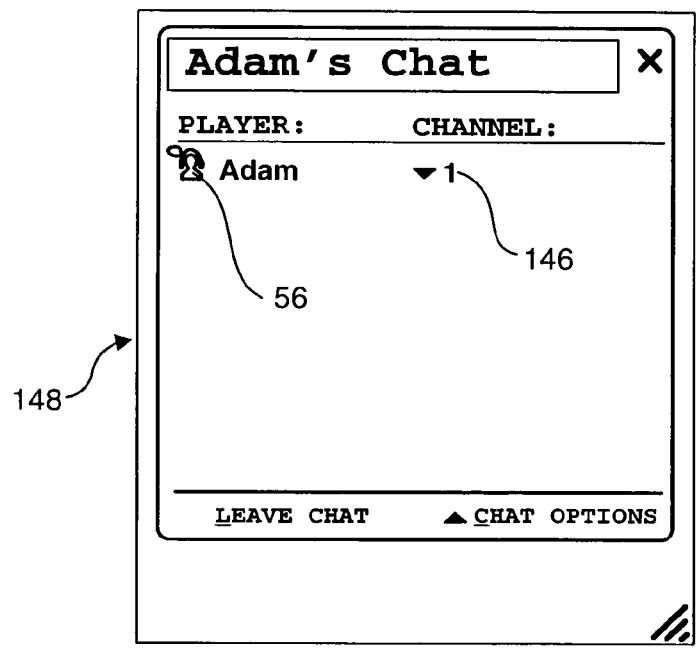
FIG. 12 is a representation of an exemplary chat room pane displayed to a player who is not hosting a chat session.

The chat room pane for each player will also be changed in response to the addition of each new player to a chat session. With reference to FIG. 11, upon joining Adam's chat session, a pull-down channel assignment control 142 with a current value indicating an assignment of channel 1 will be disposed adjacent to Burt's name in a chat room pane 144 on Adam's PC 12 so as to indicate to Adam that Burt is assigned to channel 1 on Adam's channel controller device 18. Similarly, a pull-down channel assignment control 146 with a current value indicating an assignment of channel 1 will be disposed adjacent to Adams's name in a chat room pane 148 on Burt's PC 13 so as to indicate to Adam that Burt is assigned to channel 1 on Adam's channel controller device 19, as shown in FIG. 12. Also, a gaming utility status icon 56 will be displayed adjacent each of Burt's and Adam's names in respective chat room panes 144 and 148, indicating that Adam and Burt are presently participating in the chat session.

Note the differences between chat room panes 144 and 148. In a chat room pane that is displayed on a chat session host's computer, both the contacts who are presently in the chat session and invited contacts are shown, with corresponding chat channel assignments or "invited" statuses also being displayed. For example, since Adam is the chat session host, both Burt, who has joined Adam's chat session, and Don and Chuck, who have been invited to the chat session, but are yet to join, are displayed in Adam's chat room pane 144. In contrast, a chat participant who is not the host of the chat session will only see players other than themselves who are participating in the chat session. Thus, only Adam is shown in Burt's chat room pane 148. Additionally, note that IP address 47 is present on Adam's chat room pane 144 (i.e., the chat session host's chat room pane), but is not present on Burt's chat room pane 148 (i.e., not on the chat room pane of a chat session participant who is not hosting the session). The reason that the IP address is not shown in the chat room pane of those participants who are not acting as the host is to enable the host to control who may join a chat session (in the case of invite-only chat sessions).

With reference to FIG. 8, recall that when Don and Chuck were initially invited to join the chat session, neither had an MSN messenger availability status indicating that they were immediately available to participate in the session. More specifically, Chuck's MSN messenger availability status was "offline," indicating that he was presently not logged into MSN messenger, while Don's MSN messenger availability status was "busy," an availability status that was manually selected by Don at some earlier point in time.

Figure 13:
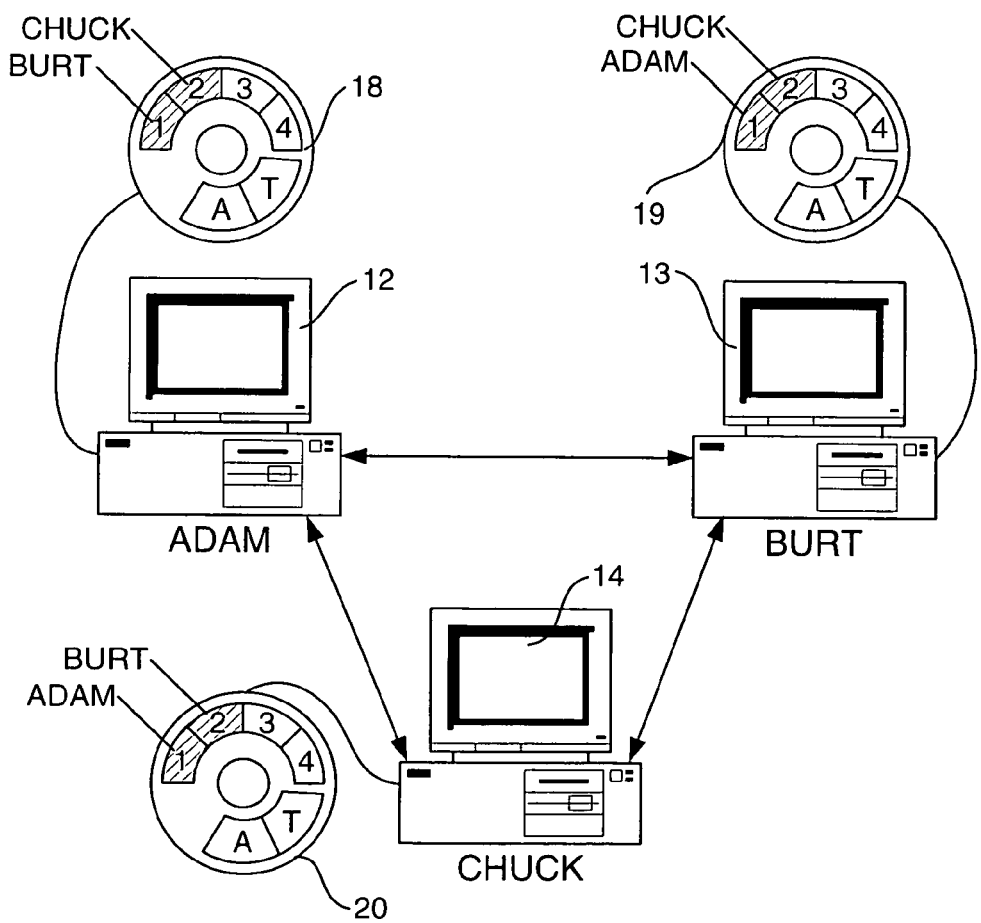
FIG. 13 is a schematic diagram illustrating the automatic assignment of chat channels when a third player joins the voice chat session.

Gaming utility 30 enables invitations to be stored and automatically forwarded so that an invited player can be immediately notified of such an invitation upon logging onto MSN messenger. For instance, if shortly after Adam sends out the original invitation to have Burt, Don, and Chuck to join the chat session, Chuck logs onto Internet 10 and MSN messenger, and opens an instance of gaming utility 30. Upon these events occurring, Chuck will receive an invitation to join Adam's chat session, comprising the modeless dialog and audio invitation that were received earlier by Burt, as discussed above. It is noted that if Chuck is already logged into MSN messenger and has yet to launch gaming utility 30, Chuck will be notified of the invitation upon launching gaming utility 30. Optionally, if Chuck launches gaming utility 30 before logging into MSN messenger, he will be prompted to do so and will receive the invitation message when he logs into MSN messenger. Now suppose that Chuck accepts the invitation. At this point, Chuck will be assigned to the second channel on each of Adam and Burt's channel controller devices 18, 19, as shown in FIG. 13. At the same time, Adam and Burt are respectively assigned to the first and second channels of Chuck's channel controller device 20. Furthermore, each of channels 2 is automatically enunciated on Adam's, Burt's, and Chuck's respective channel controller devices. Note that at this point, first channel indicators 94 may (as shown in the Figure) or may not be lighted, depending on whether either of Adam or Burt has toggled their respective first channel buttons 82 to an active or inactive condition.

In addition to providing visual indicia concerning the new channel assignments, each of Adam, Burt and Chuck will receive a verbal announcement corresponding to their respective channel assignments over their headsets, as follows. Both Adam and Burt will hear, "Chuck connected on two," while Chuck will hear, "Adam connected on one, Burt connected on two."

Figure 14:
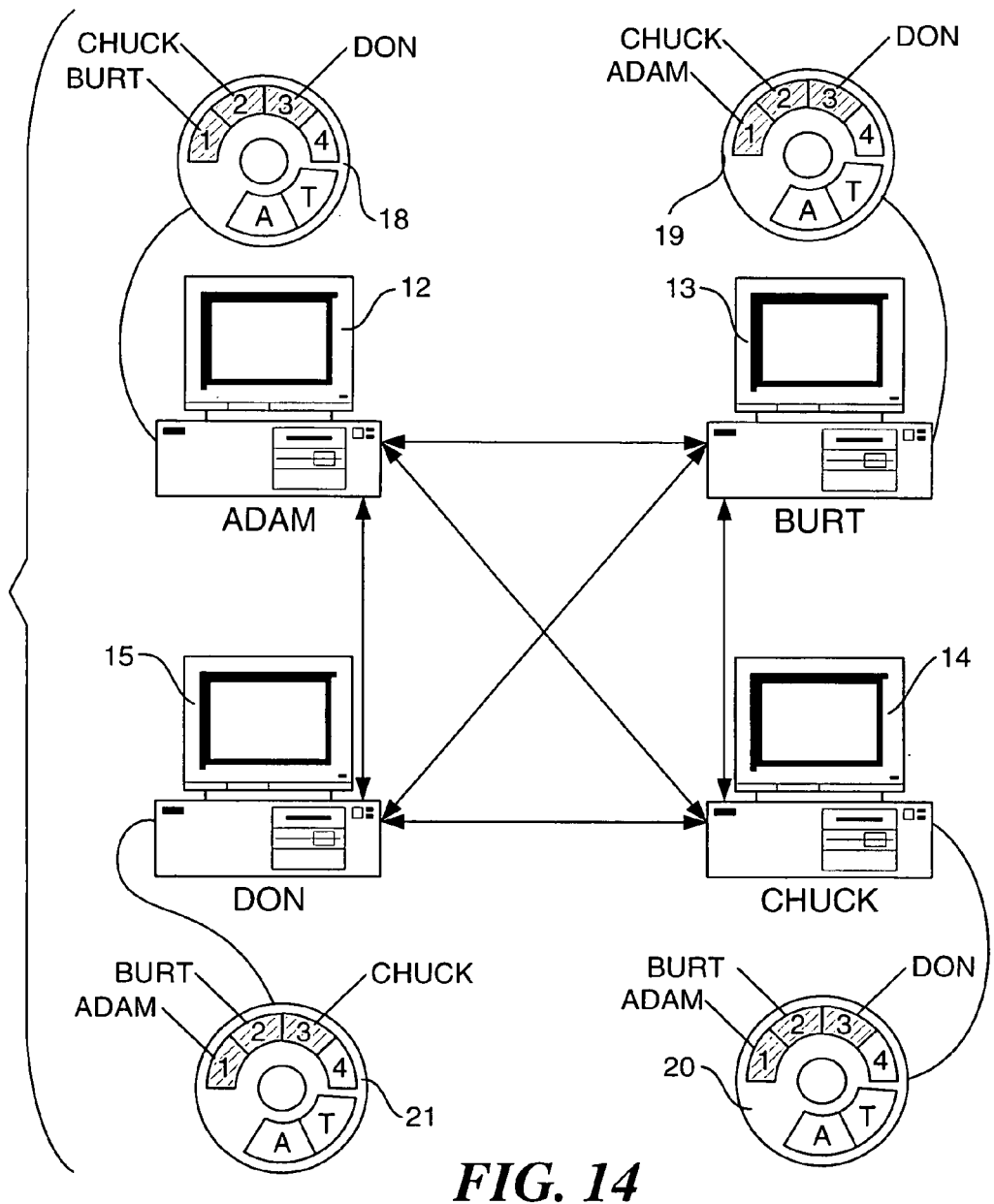
FIG. 14 is a schematic diagram illustrating the automatic assignment of chat channels when a fourth player joins the voice chat session.

As discussed above, Don had an MSN messenger status of "busy" when Adam sent out the original invitations to Burt, Chuck, and Don. Suppose that Don selected this status because he needed to perform an online check of his stock portfolio, but didn't want to be bothered while he was doing so and didn't want to log off of MSN messenger. Upon completing this task, assume further that Don decides to change his availability status back to "online" by activating status pull-down control 38 and selecting the "online" option from pull-down list 68. In response to this selection, since Don is now available to join Adam's chat session and will automatically be forwarded the invitation (both modal dialog and verbal message) via MSN messenger and gaming utility 30. Upon electing to join Adam's chat session, the channel assignments for each of Adam, Burt, Chuck, and Don will correspond to the diagram shown in FIG. 14. As was the prior case, since Don is the newcomer, Don will be assigned to the third channel of each of Adam's, Burt's, and Chuck's respective channel controller devices 18, 19, 20, and third channel indicator 97 on each of these devices will be lighted. With respect to Don's channel controller device 21, Adam, Burt, and Chuck will be assigned to channels 1, 2, and 3, respectively. Additionally, each of the chat participants will be verbally apprised of their respective chat channel assignments, e.g., Adam, Burt, and Chuck will hear, "Don connected on three," while Don will hear, "Adam connected on one, Burt connected on two, Chuck connected on three."

Figure 15:
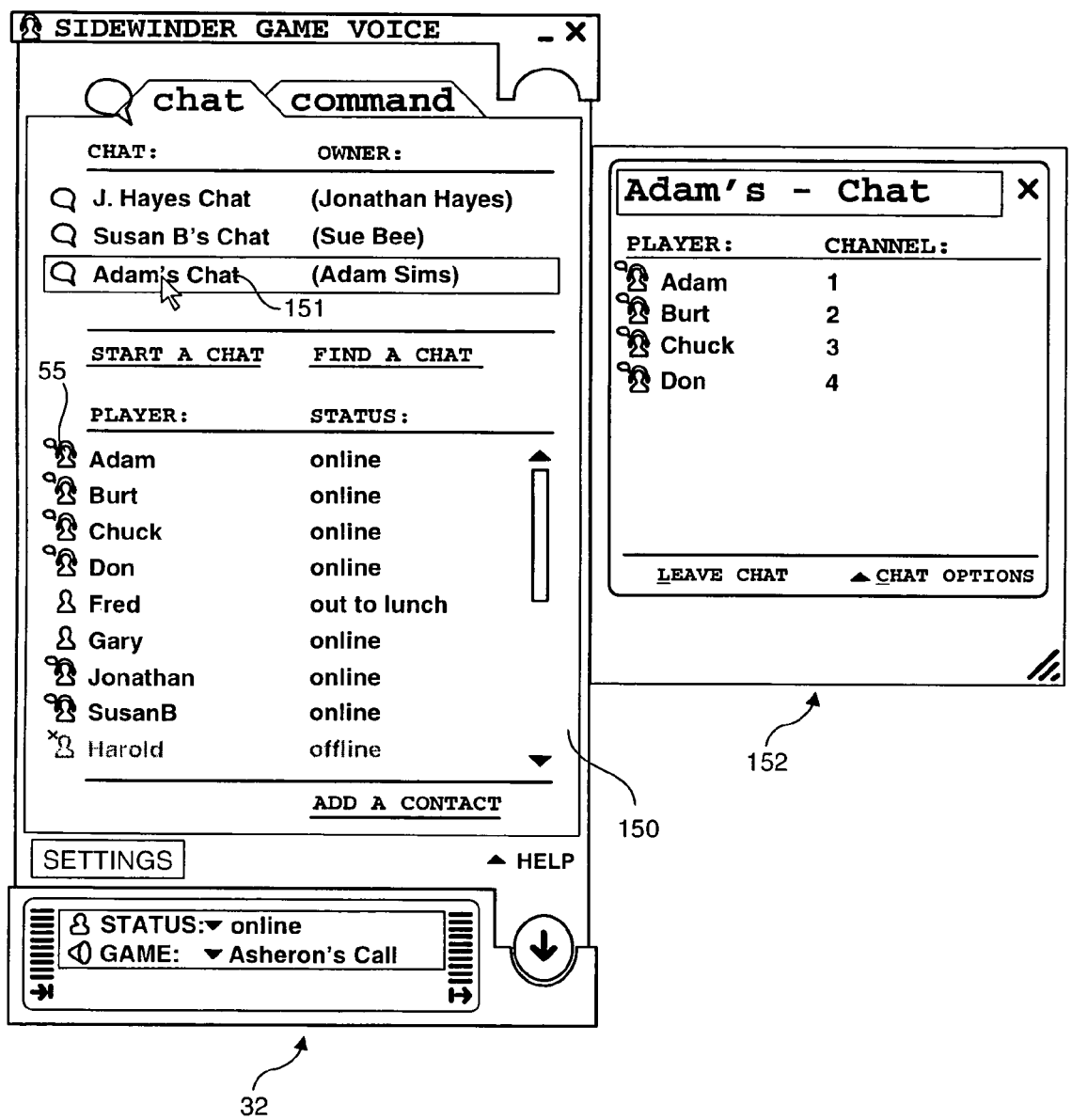
FIG. 15 is a representation of the user interface frame and an exemplary chat room pane illustrating how a player joins an open voice chat session.

As discussed above, in addition to enabling contacts to join a chat session via invitation, contacts may join any open chat session that appears in their chat panes. Suppose that Evan and Fred are friends of Adam, Burt, Chuck, and Don, and frequently play multi-player games with them. Both Evan and Fred are online, and logged into MSN messenger; Evan is running an instance of gaming utility 30, while Fred is not; Evan has selected his availability status to be "be right back," while Fred has selected his availability status to be "out to lunch." Further, suppose that Evan has finished his present task, and would like to join a chat session. Upon expanding his gaming utility 30 UI Frame 32 (or returning to a UI Frame that has already been expanded), Evan will see a chat pane 150 that includes Adam's Chat entry 151, as shown in FIG. 15. Evan immediately recognizes that his friend Adam is hosting an open chat, decides that he would like to join, and does so by clicking on Adam's Chat entry 151.

Figure 16:
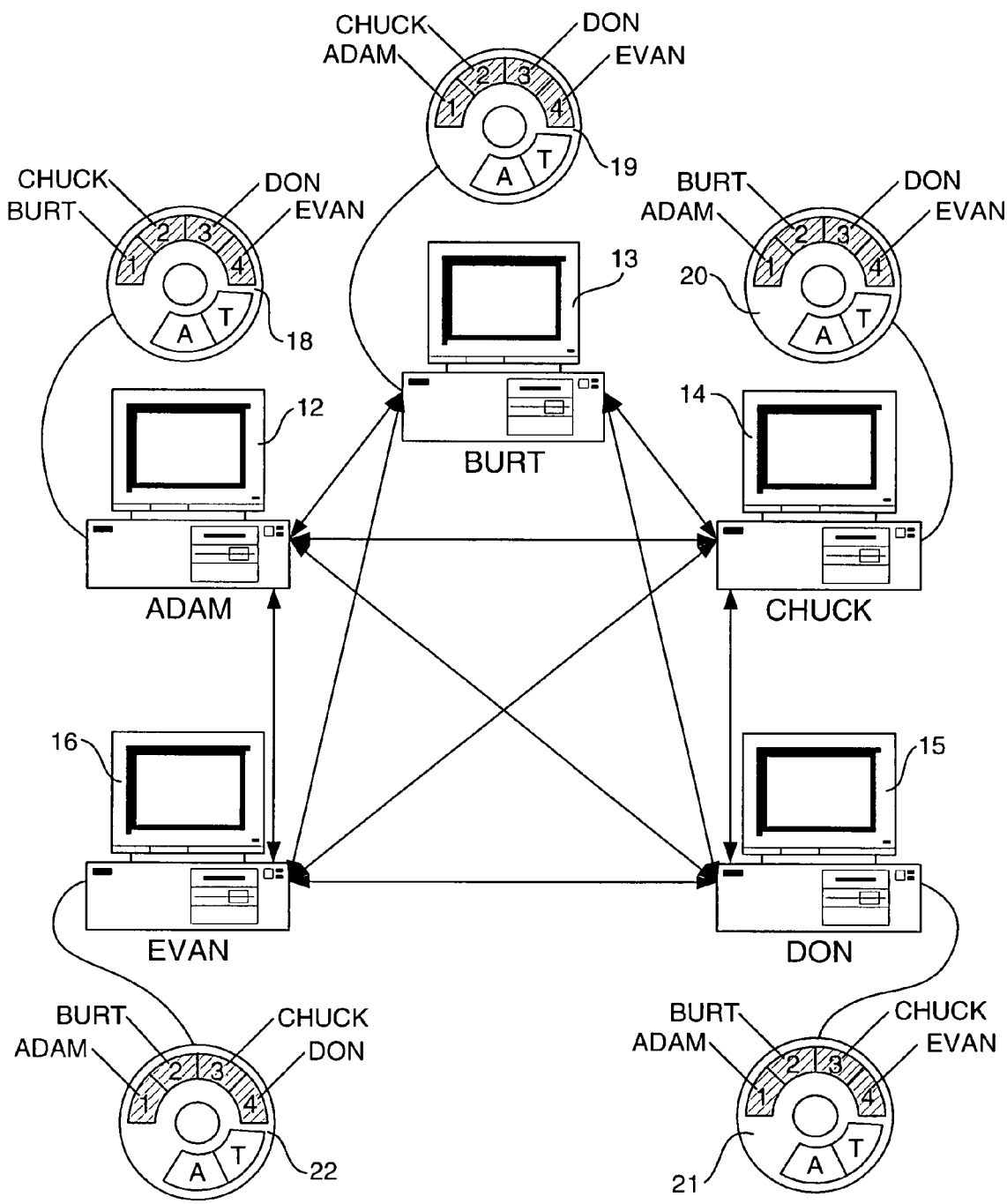
FIG. 16 is a schematic diagram illustrating the automatic assignment of chat channels when a fifth player joins the voice chat session.

Upon joining Adam's chat session, Evan will be assigned to channel 4, the next available channel on each of Adam's, Burt's, Chuck's, and Don's channel controller devices 18, 19, 20, 21, respectively, as shown in FIG. 16. Evan's chat room pane will appear like a chat room pane 152 shown in FIG. 15. In addition, Adam, Burt, Chuck, and Don have been respectively assigned to channels 1, 2, 3, and 4 of Evan's channel controller device 22, and each of Adam, Burt, Chuck, and Don receive a verbal announcement that states, "Evan connected on four, while Evan will hear a verbal announcement: "Adam connected on one, Burt connected on two, Chuck connected on three, Don connected on four."

Figure 17:
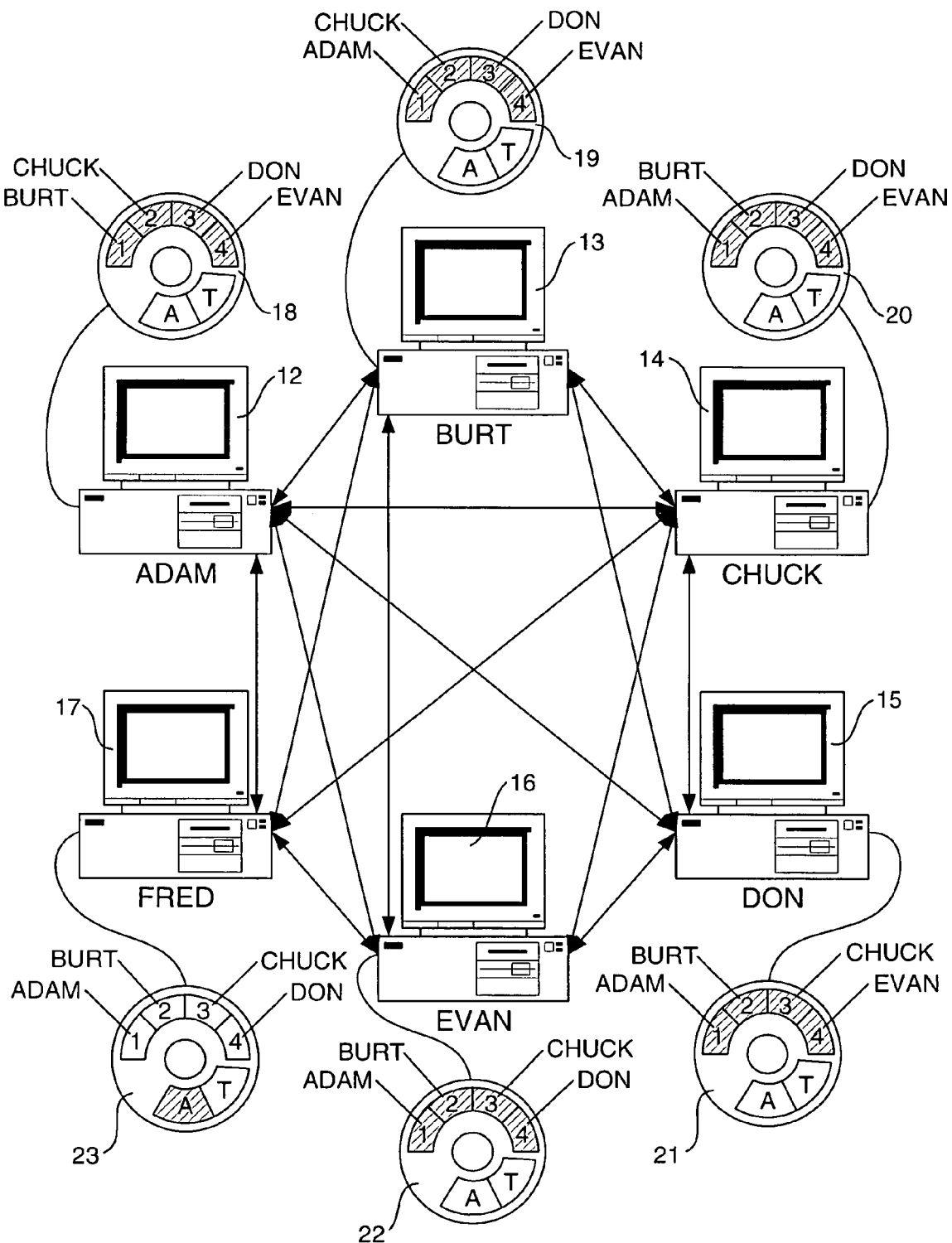
FIG. 17 is a schematic diagram illustrating the automatic assignment of chat channels when a sixth player joins the voice chat session.

Now suppose that Fred starts an instance of gaming utility 30 and sees that Adam is hosting an open chat (Fred's chat pane would appear like chat pane 150, except that Fred would not appear in the list of contacts, and Evan would). As was the case with Evan, above, Fred would join Adam's chat session by clicking on Adam's Chat entry 152. Upon doing so, Fred would join the chat session, but would not be assigned to a new channel, since there are no unassigned channels presently available. As a result, the channel assignments for each of Adam, Burt, Chuck, Don, and Evan remains the same as they were before Fred joined, as shown in FIG. 17. Accordingly, in this initial assignment of chat channels, the only way for Adam, Burt, Chuck, Don, and Evan to chat with Fred is to use "team" button 86 or "all" button 87. Additionally, "all" channel indicator 100 on Fred's channel controller device 23 is lighted to indicate that the all channel is Fred's presently active channel. In summary, if a contact joins a chat session after all of the individual channels have been assigned, that person will have his "all" button activated, and individual buttons will be assigned to prior chat session participants based on the order in which they joined the chat session until all of the available individual chat channels are assigned.

The verbal channel announcements are also changed when all of the individual channels have been assigned and a new chat participant joins the chat session. In the foregoing case, Adam, Burt, Chuck, Don, and Evan will all hear, "Fred joined chat but not assigned to channel," while Fred will hear, "Adam assigned to one, Burt assigned to two, Chuck assigned to three, Don assigned to four, Evan was not assigned."

In addition to the automatic assignment of contacts to channels, individual players can reassign contacts to channels as they wish. For example, several contacts may be assigned to a single channel, or no channels at all. Furthermore, selected players may be assigned to the "team" channel. Note that none of the players can be assigned to the "all" channel, as when the "all" channel is the active channel on a player's channel controller device, all of the chat session participants receive voice chat data picked up by that player's microphone 28.

Figure 18:
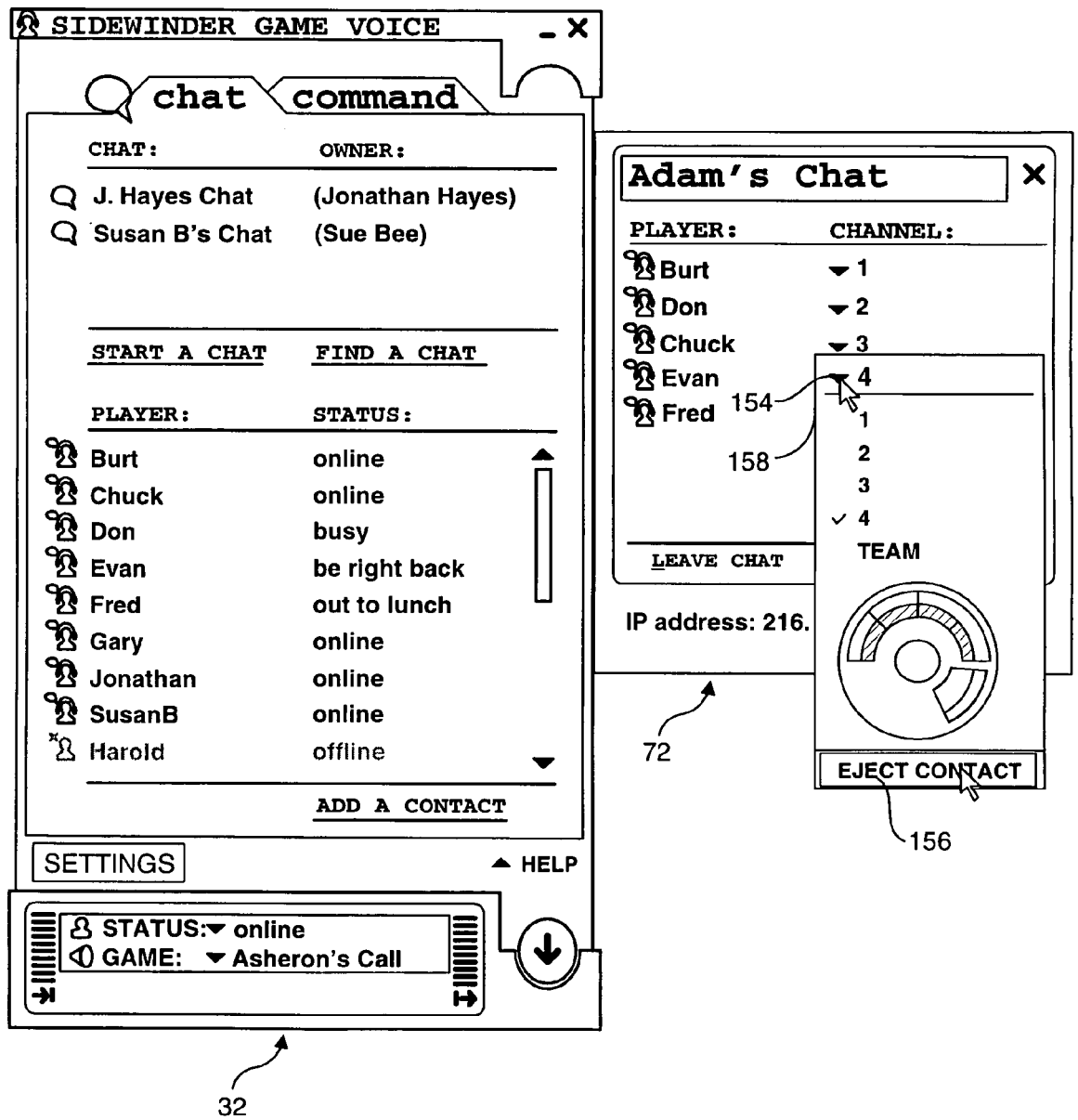
FIG. 18 is a representation of the user interface frame and an exemplary chat room pane that includes a channel assignment pull-down control enabling a host to selectively eject a player.

Another option available to the host (but not to any of the other players) is the ability to "eject" players from the chat session. Recall that even though Evan and Fred were not invited by Adam to join Adam's chat session, they were both able to join the chat session because "Adam's Chat" appeared in the list of ongoing chat sessions listed in their chat panes. Suppose that Evan is a pleasant person when participating in a chat session, but tends to be disruptive when participating in multiplayer games. Accordingly, Adam decides that he doesn't want Evan to join an impending game, so he decides to eject Evan from the current chat session. A host can select to eject a player by selecting the player from the list of chat session participants on chat room pane 72, activating a channel assignment pull-down control 154 adjacent to the player, and selecting an "Eject Contact" option 156 in a pull-down option list 158, such as shown in FIG. 18. By choosing this option, Adam will eject Evan from the chat session. Since the chat session is open, the ejected player may attempt to rejoin the chat session. The host can prevent this by changing the chat session to an invite-only session, as described above.

Figure 19:
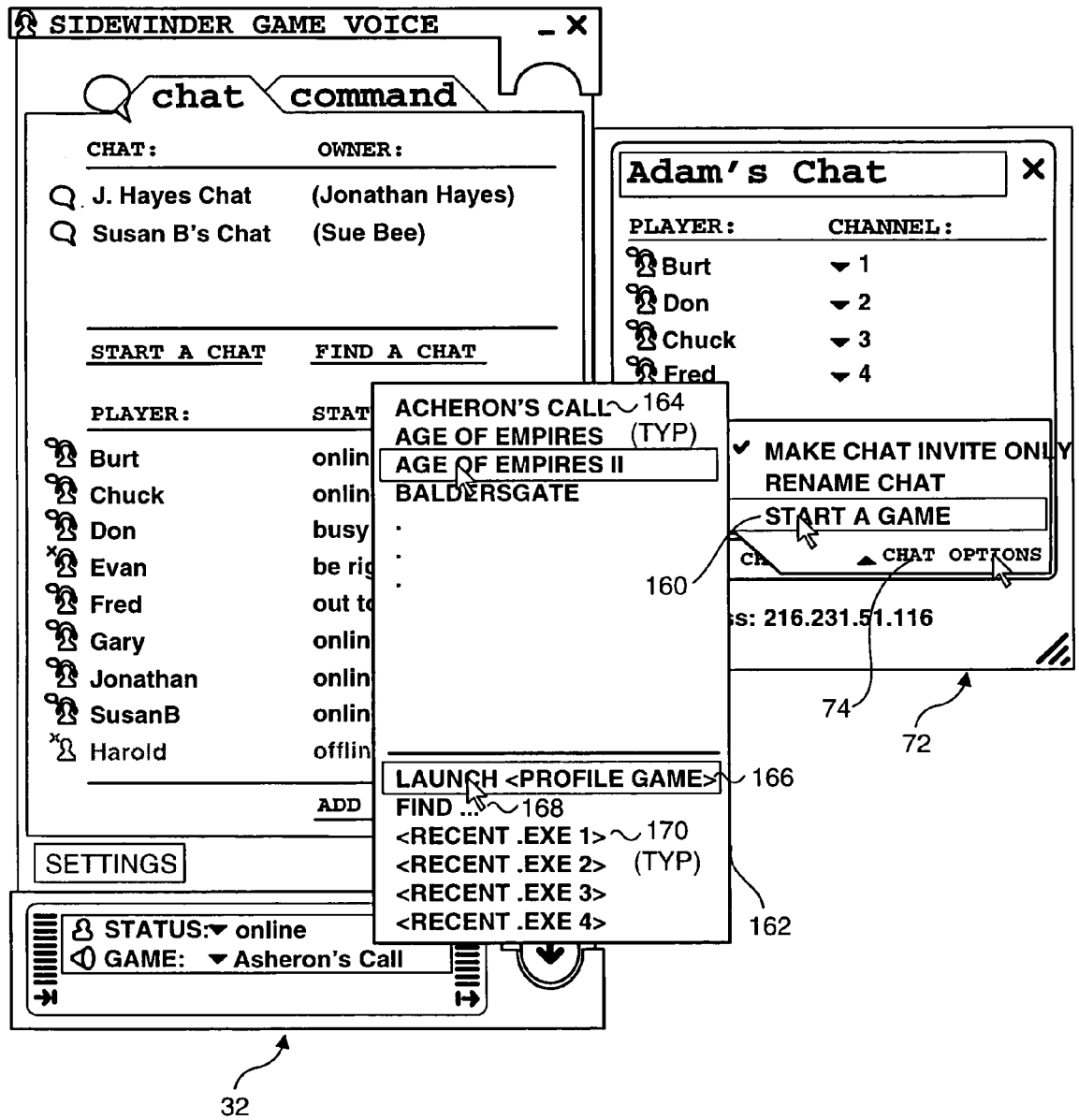
FIG. 19 is a representation of the user interface frame and a cascaded game selection menu that is used to launch a multiplayer online computer game.

With reference to FIG. 19, when all of the players the host desires to have participate in a multiplayer online computer game have joined the host in the chat session, the host can launch an instance of a DIRECTPLAY™ Lobby Game on each of the chat session participants' computers by activating "Chat Options" control 74, and selecting a "Start a Game" option 160. This will cause a cascaded game selection menu 162 to be displayed, enabling the host to select one of a plurality of DIRECTPLAY™ Lobby Games 164 listed in an upper portion of a the menu, whereupon the selected DIRECTPLAY™ Lobby Game will be automatically launched on all of the chat participants' computers that have the DIRECTPLAY™ Lobby Game installed. Optionally, if the game corresponding to the current game command set is a DIRECTPLAY™ Lobby Game, this game can also be launched on all of the chat participants' computers that have the game installed by selecting a "Launch <profile game>" option 166. Preferably, the DIRECTPLAY™ Lobby Games listed in game selection menu 162 will include a predefined list of DIRECTPLAY™ Lobby Games and any other DIRECTPLAY™ Lobby Games that are registered on a player's computer.

Figure 20:
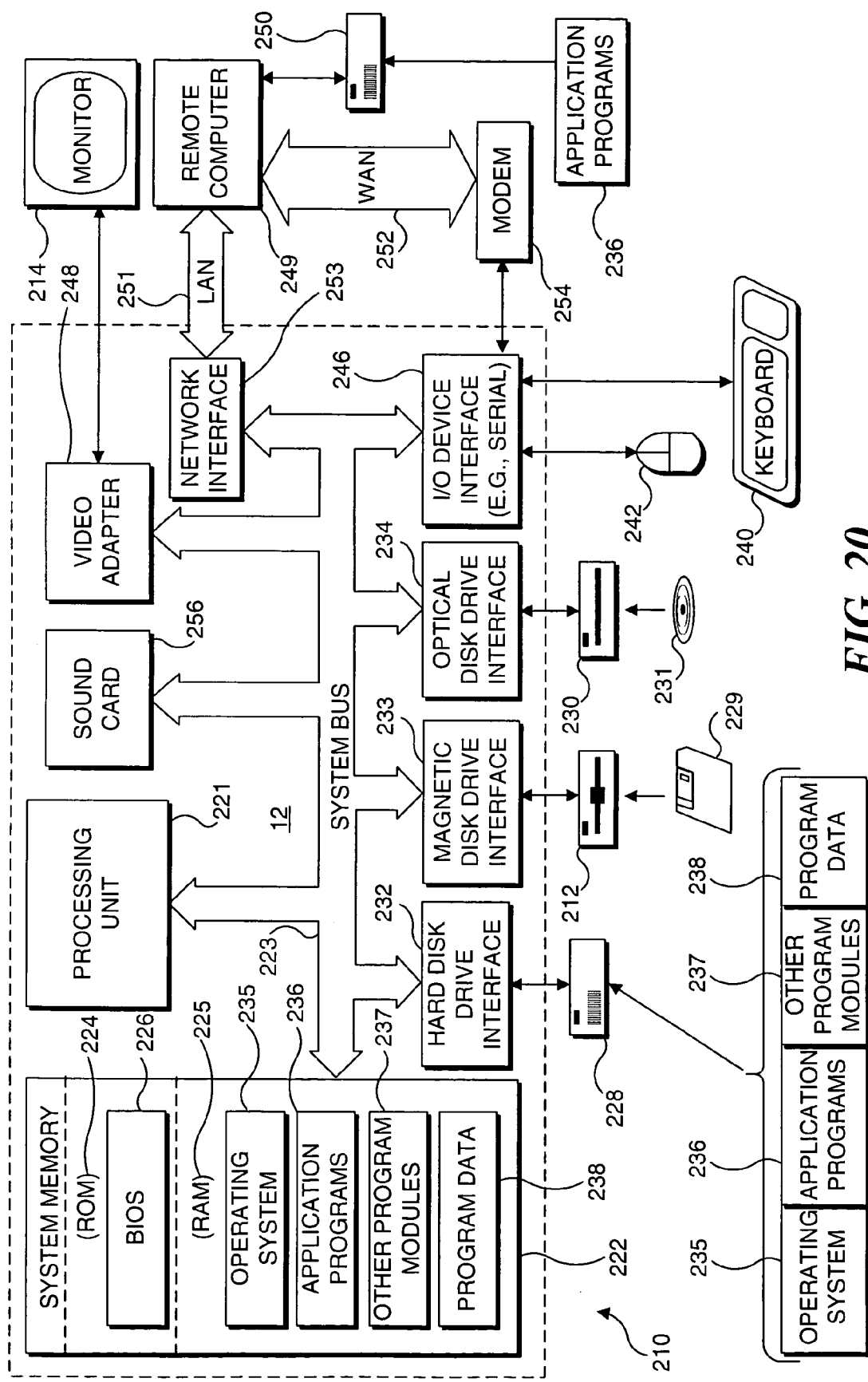
FIG. 20 is a schematic block diagram of a PC system with which the present invention can be used.

There will be instances where the game participants will want to play a multiplayer online computer game that is not a DIRECTPLAY™ Lobby Game. In these instances, the players in the chat session will have to agree upon a game to play (or be informed by the host of a game selected by the host that the host will be launching or has already launched), and each player will have to manually start an instance of the agreed-upon or host-selected game. Accordingly, game selection menu 162 further includes a "FIND . . . " option 168 that is used to search a player's computer for any executable (i.e., .EXE) files installed on the player's computer, whereby the player can selectively launch one of the .EXE files in a corresponding set of search results. Although any .EXE file may be chosen to be launched from the search results set, the players preferably will select the executable for the agreed-upon or host-selected game. As an option to searching for a game executable each time a non-DIRECTPLAY™ Lobby Game is to be played, a list of the four most recently launched .EXE files 170 (which preferably will correspond to game executables) will be displayed toward the bottom of game selection menu 162. FIG. 20 and the following discussion are intended to provide a brief, general description of a suitable computing environment for use in connection with implementing the present invention. Although not required, certain aspects of the present invention are described in the general context of computer executable instructions, such as program modules, that are executed by a PC or workstation. Generally, program modules include routines, programs, objects, components, data structures, etc. that perform particular tasks. Moreover, those skilled in the art will appreciate that this invention may well be practiced with other computer system configurations, including hand-held devices, multiprocessor systems, microprocessor based or programmable consumer electronic devices, network personal computers, minicomputers, mainframe computers, and the like.

With reference to FIG. 20, an exemplary system for implementing the present invention includes a general purpose computing device in the form of a conventional PC system 210, provided with a processing unit 221, a system memory 222, and a system bus 223. The system bus couples various system components including the system memory to processing unit 221 and may be any of several types of bus structures, including a memory bus or memory controller, a peripheral bus, and a local bus using any of a variety of bus architectures. The system memory includes read only memory (ROM) 224 and random access memory (RAM) 225. A basic input/output system (BIOS) 226, containing the basic routines that help to transfer information between elements within PC system 210, such as during start-up, is stored in ROM 224. PC system 210 further may include a hard disk drive 228 for reading from and writing to a hard disk, not shown, and may include a magnetic disk drive 212 for reading from or writing to a removable magnetic disk 229, and an optical disk drive 230 for reading from or writing to a removable optical disk 231, such as a compact disk-ROM (CD-ROM), DVD, or other optical media. Hard disk drive 228, magnetic disk drive 232, and optical disk drive 230 are connected to system bus 223 by a hard disk drive interface 232, a magnetic disk drive interface 233, and an optical disk drive interface 234, respectively. The drives and their associated computer-readable media provide nonvolatile storage of computer readable machine instructions, data structures, program modules and other data for PC system 210. Although the exemplary environment described herein employs a hard disk, removable magnetic disk 229, and removable optical disk 231, it will be appreciated by those skilled in the art that other types of computer readable media, which can store data that are accessible by a computer, such as magnetic cassettes, flash memory cards, digital video disks, Bernoulli cartridges, RAM cards, ROM, and the like, may also be used in the exemplary operating environment.

A number of program modules may be stored on the hard disk, magnetic disk 229, optical disk 231, ROM 224 or RAM 225, including an operating system 235, one or more application programs 236 (such as a multiplayer game), other program modules 237, and program data 238. A user may enter commands and information into PC system 210 through input devices such as a keyboard 240, microphone 28 discussed above (but not shown in this Figure), and a pointing device 242. Other input devices (not shown) include a joystick, game pad, satellite dish, scanner, or the like. These and other input devices are often connected to processing unit 221 through an input/output (I/O) interface 246 that is coupled to the system bus. The term I/O interface is intended to encompass each interface specifically used for a serial port, a parallel port, a game port, a keyboard port, and/or (USB) port, as appropriate for the external devices that are thus coupled to the PC system. A monitor 214 or other type of display device is also connected to system bus 223 via an appropriate interface, such as a video adapter 248. In addition to the monitor, PCs are often coupled to other peripheral output devices (not shown), such as printers. Additionally, a soundcard 256 is used to supply a drive signal to a pair of speakers (not shown) to produce game sounds.

PC system 210 may operate in a networked environment using logical connections to one or more remote computers, such as a remote computer 249. Remote computer 249 may be another PC, a server, a router, a network PC, a peer device, or other common network node, and typically includes many or all of the elements described above in connection with PC system 210, although only an external memory storage device 250 has been illustrated in FIG. 20. The logical connections depicted in FIG. 20 include a local area network (LAN) 251 and a wide area network (WAN) 252. Such networking environments are common in offices, enterprise-wide computer networks, intranets and the Internet.

When used in a LAN networking environment, PC system 210 is connected to LAN 251 through a network interface or adapter 253. If used in a WAN networking environment, PC system 210 typically includes a modem 254, or other means for establishing communications over WAN 252, such as the Internet. Modem 254, which may be internal or external, is connected to the system bus 223, or coupled to the bus via I/O device interface 246, i.e., through a serial port. In a networked environment, program modules depicted relative to PC system 210, or portions thereof, may be stored in the remote memory storage device. It will be appreciated that the network connections shown are exemplary and other means of establishing a communications link between the computers may be used.

In the foregoing description of a preferred form of practicing the invention, MSN messenger was disclosed to provide behind the scenes online messaging service for supporting gaming utility 30. This exemplary disclosure is not meant to be limiting, as it will be understood by those skilled in the art that other online messaging services can alternatively be used, including America Online Corporation's instant messaging service, and ICQ™ messaging service. Furthermore, in the exemplary configuration discussed above, a plurality of PCs are connected to each other across a communications network. It is envisioned that other electronic devices may be used as well, such as then consumer terminals, mobile phones, Pocket PCs, TV attached boxes (set top, gaming, video management), home servers, small business server appliances, and various focused enterprise devices.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for enabling a host player to select one or more other participants to join in playing a multi player online electronic game, comprising the steps of:
   (a) enabling the host player to create a list of contacts comprising one or more other persons who may be interested in participating in playing the multiplayer online electronic game;
   (b) enabling the host player to select one or more of the other persons from among the list of contacts to participate in playing the multi player online electronic game;
   (c) automatically sending an electronic invitation to each of the one or more other persons selected by the host player, to join in playing the multiplayer online electronic game, wherein the electronic invitation comprises a verbal message;
   (d) enabling each of the one or more other persons who receive the electronic invitation that was automatically sent, to selectively join the multi player online electronic game as a participant; and
   (e) providing an availability status for each person in the list of contacts so as to enable the host player to identify persons in the list of contacts who are currently available for playing the multiplayer online electronic game.

2. The method of claim 1, further comprising the step of providing an availability status for each person in the list of contacts so as to enable the host player to identify persons in the list of contacts who are currently available to participate in playing the multiplayer online electronic game.

3. The method of claim 2, further comprising the step of enabling each person in the list of contacts to select the availability status indicating the person's availability for participating in playing the multiplayer online electronic game.

4. The method of claim 1, wherein the host player is enabled to build a list of chat contacts through use of an online messaging service, said list of chat contacts automatically being parsed to create the list of contacts.

5. The method of claim 4, wherein at least one person in the list of contacts is not currently logged into the online messaging service and has been invited to join the multiplayer online electronic game, further comprising the step of automatically forwarding the electronic invitation to join the multiplayer online electronic game to said at least one person when said at least one person logs into the online messaging service.

6. The method of claim 4, wherein selection of game participants and voice chat communications before and during game play is facilitated by a gaming utility that runs on an electronic device operated by each game participant and at least one person in the list of contacts has been invited to join the multi player online electronic game and has not started an instance of the gaming utility on the electronic device(s) operated by said at least one person, further comprising the step of automatically forwarding the electronic invitation to join the multi player online electronic game to said at least one person when said at least one person launches an instance of the gaming utility on the electronic device(s) operated by said at least one person.

7. The method of claim 1, further comprising the step of enabling the electronic invitation to be accepted by a person invited to join the game through a verbal response spoken by said person.

8. The method of claim 1, further comprising the steps of providing a list of multiplayer online electronic games to the host player; and enabling the host player to select the multi player online electronic game from said list of multi player online electronic games.

9. The method of claim 1, further comprising the steps of:
   (a) providing a user interface including a first display area on which the list of contacts is displayed and a second display area corresponding to a voice chat session; and
   (b) enabling the host to select the one or more contacts to invite to join the voice chat session by selecting one or more contacts from among the list of contacts displayed in the first display area and dragging and dropping them onto the second display area.

10. The method of claim 9, wherein a plurality of contacts can be selected and dragged and dropped onto the second display area at one time.

11. A computer readable medium having computer executable instructions for performing the steps recited in claim 1.

12. A method for enabling a host player to select one or more other players to participate in a multiplayer online electronic game played using a plurality of electronic devices linked in communication over a communications network, each of said plurality of electronic devices being operated by a different player, the method comprising the steps of:
   (a) enabling the host player to initiate a chat session;
   (b) enabling the host player to invite one or more other players to join the chat session, and sending an electronic invitation to join the chat session to each of the one or more players invited by the host player to join the chat session;
   (c) enabling any of the players who were invited by the host, to be a participant in the chat session;
   (d) enabling the host player to forward a network address corresponding to an electronic device being operated by the host to any other player participating in the chat session;
   (e) automatically launching an instance of the multiplayer online electronic game on each electronic device being operated by any player participating in the chat session, said step of automatically launching being in response to a game initiating action performed by the host player so that any player participating in the chat session automatically becomes a participant in the multiplayer online electronic game; and
   (f) enabling each player to transmit voice chat data to all of the other players who have joined the chat session.

13. The method of claim 12, further comprising the step of providing a network address of the electronic device the host player is using and operating so as to enable the host player to invite one or more other players to join in playing the multi player online electronic game, by referencing said network address.

14. The method of claim 12, wherein the host player is a member of an online messaging service that enables the host player to build a player contact list comprising a list of one or more players with whom the host prefers to chat and/or play multi player online electronic games, further comprising the steps of:
(a) displaying the player contact list to the host player; and
(b) enabling the host player to select one or more other players to participate in playing the multiplayer online electronic game from the player contact list.

15. The method of claim 14, further comprising the step of providing an availability status for each player in the player contact list.

16. The method of claim 14, further comprising the step of enabling each player to select an availability status indicating the player's availability to join a chat session.

17. The method of claim 14, further comprising the steps of:
(a) providing a user interface including a first display area on which the list of contacts is displayed and a second display area corresponding to a voice chat session; and
(b) enabling the host to select the one or more contacts to invite to join the voice chat session by selecting one or more contacts from among the list of contacts displayed in the first display area and dragging and dropping them onto the second display area.

18. The method of claim 17, wherein a plurality of contacts can be selected and dragged and dropped onto the second display area at one time.

19. The method of claim 12, wherein the electronic invitation includes an audible announcement apprising any player receiving the electronic invitation that the host player has invited the player to join the chat session.

20. The method of claim 19, further comprising the step of enabling the electronic invitation to join the chat session to be accepted by a recipient through a verbal response spoken by the recipient, whereupon said recipient becomes a participant in the chat session.

21. The method of claim 12, wherein each player is a member of an online messaging service that enables the player to build a player contact list comprising a list of one or more players with whom the player prefers to chat and/or play multiplayer online computer games, further comprising the step of:
(a) providing a list of chat sessions that are being hosted by at least one other player contact in a player contact list built by the player; and
(b) enabling the player to join a chat session appearing in the list of chat sessions.

22. The method of claim 12, further comprising the step of providing a headset operatively coupled in communication with each of said plurality of electronic devices, each headset comprising at least one sound transducer and a microphone employed by each player to participate in a voice chat session.

23. The method of claim 12, further comprising the steps of providing a list of multiplayer online electronic games; and enabling the host player to select the multi player online electronic game that will be played.

24. A computer readable medium having computer executable instructions for performing the steps recited in claim 12.

25. A method for enabling a host player, who is a member of an online messaging service that enables the host player to build a player contact list of one or more players with whom the host prefers to chat and/or play multiplayer online computer games, to select one or more other players to participate in a multiplayer online electronic game played using a plurality of electronic devices linked in communication over a communications network, each of said plurality of electronic devices being operated by a different player, the method comprising the steps of:
(a) enabling the host player to initiate a voice chat session;
(b) enabling the host player to invite one or more other players to join the voice chat session;
(c) enabling any of the players who were invited by the host, to be a participant in the voice chat session;
(d) enabling the host player to forward a network address corresponding to an electronic device being operated by the host to any other player participating in the voice chat session; and
(e) providing a player contact list to the host player and enabling the host player to select one or more players to participate in the multi player online electronic game from the player contact list by transmitting a voice chat message from the host player to any other player participating in the voice chat session, said voice chat message identifying a multiplayer online electronic game that the host player will be launching or has already launched on the electronic device operated by the host player so that any other player participating in the voice chat session can selectively launch an instance of the multiplayer online electronic game on the electronic device operated by the player, so that any player participating in the chat session who selectively launches the multiplayer online electronic game becomes a participant in the multiplayer online electronic game.

26. The method of claim 25, further comprising the step of providing an availability status for each player in the player contact list.

27. A computer readable medium having computer executable instructions for performing the steps recited in claim 25.

28. A system for enabling a host player to select one or more other players to participate in playing a multiplayer online electronic game played using a plurality of electronic devices linked in communication over a communications network, each of said plurality of electronic devices being operated by a different player and including:
(a) a display on which a user interface is implemented;
(b) a memory in which a plurality of machine instructions are stored;
(c) a microphone operatively coupled to the electronic device and which produces audio signals in response to words spoken by a user into the microphone;
(d) a sound transducer operatively coupled to the electronic device so as to replicate sounds corresponding to an audio data signal received over the communications network by the electronic device to which said at least one sound transducer is operatively coupled; and
(e) a processor coupled to the memory for executing said plurality of machine instructions, said processor implementing a plurality of functions when executing the machine instructions, including:
(i) enabling the host player to initiate a chat session;
(ii) enabling the host player to invite one or more other players to join the chat session;
(iii) enabling any of the players who were invited by the host, to be a participant in the chat session;
(iv) automatically launching an instance of the multiplayer online electronic game on each electronic device being operated by any player participating in the chat session, said step of automatically launching being in response to a game initiating action performed by the host player so that any player participating in the chat session automatically becomes a participant in the multi player online electronic game;

(v) employing the microphone, the sound transducer, and the electronic device to enable each player to transmit voice chat data to all other players participating in the chat session;

(vi) sending an electronic invitation to a player being invited by the host player to join the chat session;

(vii) producing an audible announcement with said at least one sound transducer apprising a recipient of the electronic invitation that the host player has invited the recipient to join the chat session; and (viii) enabling the electronic invitation to be accepted by the recipient through use of a verbal response spoken into the microphone by the recipient.

29. The system of claim 28, wherein the host player is a member of an online messaging service that enables the host player to build a player contact list of one or more players with whom the host may desire to play multiplayer online computer games, and wherein execution of the plurality of machine instructions further implements the functions of:

(a) obtaining the player contact list from the online messaging service;

(b) displaying the player contact list to the host player; and (c) enabling the host player to select one or more players to participate in the multiplayer online electronic game from the player contact list.

* * * * *